United States Patent
Yamaguchi

(10) Patent No.: US 10,129,438 B2
(45) Date of Patent: Nov. 13, 2018

(54) COLOR CONVERSION APPARATUS, NON-TRANSITORY RECORDING MEDIUM STORING COLOR CONVERSION PROGRAM AND COLOR CONVERSION METHOD

(71) Applicant: Konica Minolta, Inc., Chiyoda-ku, Tokyo (JP)

(72) Inventor: Takeshi Yamaguchi, Hachioji (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 14 days.

(21) Appl. No.: 15/642,562

(22) Filed: Jul. 6, 2017

(65) Prior Publication Data

US 2018/0013926 A1 Jan. 11, 2018

(30) Foreign Application Priority Data

Jul. 11, 2016 (JP) .................................. 2016-136616

(51) Int. Cl.
*H04N 1/60* (2006.01)
*G06T 7/90* (2017.01)
*H04N 1/00* (2006.01)
*H04N 1/047* (2006.01)

(52) U.S. Cl.
CPC ............ *H04N 1/6008* (2013.01); *G06T 7/90* (2017.01); *H04N 1/00045* (2013.01); *H04N 1/047* (2013.01); *H04N 1/6033* (2013.01); *H04N 1/6055* (2013.01); *G06T 2207/20224* (2013.01); *H04N 2201/0094* (2013.01)

(58) Field of Classification Search
CPC ............ H04N 1/6019; H04N 1/00323; H04N 1/6008; H04N 1/6044; H04N 2201/0094
See application file for complete search history.

(56) References Cited

FOREIGN PATENT DOCUMENTS

JP 2007-170883 A 7/2007

*Primary Examiner* — Christopher D Wait
(74) *Attorney, Agent, or Firm* — Buchanan Ingersoll & Rooney PC

(57) ABSTRACT

A color conversion apparatus includes a hardware processor that obtains a scanner profile created on the basis of measured RGB values and corresponding measured colorimetric values of patches in a first color chart, and creates a table including correction amounts of RGB values, each according to the level of flare estimated for a patch and each associated with an RGB-value difference and a patch-size difference, on the basis of RGB values of patches in the first color chart and RGB values of patches in a specific chart. The specific chart is created by using a part of the patches in the first color chart with the RGB value or patch size being changed. The hardware processor further corrects measured RGB values of patches in a second color chart with the table, and convers the corrected RGB values into colorimetric values with the scanner profile.

19 Claims, 10 Drawing Sheets

FIG. 12

| INPUT | | | | OUTPUT | | |
|---|---|---|---|---|---|---|
| RGB-VALUE DIFFERENCE | | | PATCH-SIZE DIFFERENCE $\Delta$Size (mm) | CORRECTION AMOUNT | | |
| $\Delta$R | $\Delta$G | $\Delta$B | | f$\Delta$R | f$\Delta$G | f$\Delta$B |
| -128 | -255 | -255 | -2 | -25 | -25 | -30 |
| ⋮ | ⋮ | ⋮ | ⋮ | ⋮ | ⋮ | ⋮ |
| 30 | 0 | 0 | -2 | -3 | 0 | 0 |
| 30 | 0 | 0 | -1 | -4 | 0 | 0 |
| 30 | 0 | 0 | 0 | -5 | 0 | 0 |
| 30 | 0 | 0 | 1 | -6 | 0 | 0 |
| ⋮ | ⋮ | ⋮ | ⋮ | ⋮ | ⋮ | ⋮ |
| 255 | 255 | 255 | -2 | 25 | 25 | 30 |

FIG. 13

| INPUT | | | | OUTPUT | | |
|---|---|---|---|---|---|---|
| RGB-VALUE DIFFERENCE | | | PATCH-SIZE DIFFERENCE $\Delta$Size (mm) | CORRECTION AMOUNT | | |
| $\Delta$R | $\Delta$G | $\Delta$B | | g$\Delta$R | g$\Delta$G | g$\Delta$B |
| -255 | -255 | -255 | -2 | -3 | -3 | -4 |
| ⋮ | ⋮ | ⋮ | ⋮ | ⋮ | ⋮ | ⋮ |
| 30 | 0 | 0 | -2 | -0.5 | 0 | 0 |
| 30 | 0 | 0 | -1 | -0.4 | 0 | 0 |
| 30 | 0 | 0 | 0 | -0.3 | 0 | 0 |
| 30 | 0 | 0 | 1 | -0.2 | 0 | 0 |
| ⋮ | ⋮ | ⋮ | ⋮ | ⋮ | ⋮ | ⋮ |
| 255 | 255 | 255 | -2 | 3 | 3 | 4 |

US 10,129,438 B2

COLOR CONVERSION APPARATUS, NON-TRANSITORY RECORDING MEDIUM STORING COLOR CONVERSION PROGRAM AND COLOR CONVERSION METHOD

Japanese Patent Application No. 2016-136616 filed on Jul. 11, 2016, including description, claims, drawings, and abstract, the entire disclosure of which is incorporated herein by reference in its entirety.

TECHNICAL FIELD

The present invention is directed to color conversion apparatuses, non-transitory recording media each storing a color conversion program and color conversion methods. In particular, the present invention is directed to a color conversion apparatus that corrects measured color values of a chart in consideration with the level of flare which occurs in measurement of the chart and then performs color conversion by using the corrected values, and non-transitory recording medium storing a color conversion program to be executed in the color conversion apparatus, and a color conversion method to be used for the color conversion apparatus.

BACKGROUND

Devices, such as scanners and printers, output device values (like RGB values or CMYK values) depending on the respective devices. To handle device values, a color conversion table (a device profile) for converting device values into device-independent colors is created, and then device values are converted into colorimetric values in a device-independent color space by using the device profile. As an example of a way to create a device profile, a description is now given of a way to create a scanner profile. To create a scanner profile, a chart for creating a scanner profile is output with a printer, and the chart is measured with a scanner and a colorimeter. RGB values obtained by measurement of the chart with the scanner and corresponding L*a*b* values in the CIE 1976 color space or XYZ values of the CIE 1931 color space obtained by measurement of the chart with the colorimeter are associated with each other, whereby a scanner profile is created. With this scanner profile, RGB values obtained by measurement of another color chart (for example, a chart for obtaining a printer condition) with a scanner can also be converted into colorimetric values like L*a*b* values.

In measurement of a chart including an array of patches with a scanner, the scanner can measure not only light reflected on a target patch which is actually measured but also diffuse light coming from patches surrounding the target patch. The degree of the diffuse light (referred to as the level of flare) coming from the surrounding patches depends on color and size of the surrounding patches. Therefore, if a chart for creating a scanner profile is different in composition (color and size of patches) from another chart to be subjected to color conversion, such a difference makes a difference in the level of flare between at the time of measuring the chart for creating a scanner profile and at the time of measuring another chart. It damages the accuracy of color conversion of another chart with a scanner profile.

With regard to a technique to restrict an occurrence of the flare in measurement of a chart, Japanese Unexamined Patent Publication (JP-A) No. 2007-170883 discloses an image forming method for creating a test chart including an array of color areas. The method includes: a step of creating a first image area including areas of colors belonging to a first color group among colors classified according to color component ratio; a step of creating a black image area adjacent to the first image area; and a step of further creating a second image area including areas of colors belonging to a second color group among the colors classified according to color component ratio.

A use of the technique disclosed in JP-A No. 2007-170883 reduces flare which occurs in measurement of the test chart, but a use of the technique for another chart having the different composition may hardly reduce flare which occurs in measurement of the chart so as to bring the level of the flare close to the level of flare which occurs in measurement of the test chart. It may result in failure of improvement of the accuracy of the above-described color conversion with a scanner profile.

SUMMARY

The present invention is directed to color conversion apparatuses, non-transitory recording media each storing a color conversion program and color conversion methods, which make it possible to properly correct the level of flare occurring in measurement of a chart having the indifferent composition from a chart for creating a scanner profile and thereby improve the accuracy of color conversion using the scanner profile.

A color conversion apparatus reflecting one aspect of the present invention is a color conversion apparatus for converting measured RGB values given by measurement of a color chart printed by a printer, into colorimetric values being L*a*b* values or XYZ values. The color conversion apparatus comprises a storage unit and a hardware processor. The hardware processor performs obtaining a scanner profile in which measured RGB values and corresponding measured colorimetric values both given by measurement of patches in a first color chart printed by the printer are associated with each other. The hardware processor further performs creating a table on a basis of RGB values of patches in the first color chart and RGB values of patches in a specific chart created by using a part of the patches in the first color chart with an RGB value or patch size being changed, wherein the table includes correction amounts of RGB values, each according to a level of flare estimated for a patch and each associated with an RGB-value difference and a patch-size difference; and storing the table in the storage unit. The hardware processor further performs correcting, by using the table, measured RGB values given by measurement of patches in a second color chart which is different from the first color chart in RGB values or patch size of at least a part of patches, to obtain corrected RGB values; and converting the corrected RGB values into colorimetric values by using the scanner profile.

A non-transitory recording medium reflecting one aspect of the present invention stores a computer-readable program for color conversion to be executed in an apparatus that converts measured RGB values given by measurement of a color chart printed by a printer, into colorimetric values being L*a*b* values or XYZ values. The program comprises instructions which, when executed by a hardware processor of the apparatus, cause the apparatus to perform the following operations. The operations comprise obtaining a scanner profile in which measured RGB values and corresponding measured colorimetric values both given by measurement of patches in a first color chart printed by the printer are associated with each other. The operations further comprise creating a table on a basis of RGB values of patches in the first color chart and RGB values of patches in a specific chart created by using a part of the patches in the first color chart with an RGB value or patch size being changed, wherein the table includes correction amounts of RGB values, each according to a level of flare estimated for a patch and each associated with an RGB-value difference and a patch-size difference; and storing the table in a storage unit of the apparatus. The operations further comprise correcting, by using the table, measured RGB values given by measurement of patches in a second color chart which is different from the first color chart in RGB values or patch size of at least a part of patches, to obtain corrected RGB values; and converting the corrected RGB values into colorimetric values by using the scanner profile.

A color conversion method reflecting one aspect of the present invention is a method for use in a printing system including a printer and a color conversion apparatus that converts measured RGB values given by measurement of a color chart printed by a printer, into colorimetric values being L*a*b* values or XYZ values. The method comprises obtaining, by the color conversion apparatus, a scanner profile in which measured RGB values and corresponding measured colorimetric values both given by measurement of patches in a first color chart printed by the printer are associated with each other. The method further comprises creating a table by the color conversion apparatus on a basis of RGB values of patches in the first color chart and RGB values of patches in a specific chart created by using a part of the patches in the first color chart with an RGB value or patch size being changed, wherein the table includes correction amounts of RGB values, each according to a level of flare estimated for a patch and each associated with an RGB-value difference and a patch-size difference; and storing, by the color conversion apparatus, the table in a storage unit of the color conversion apparatus. The method further comprises correcting, by the color conversion apparatus, by using the table, measured RGB values given by measurement of patches in a second color chart which is different from the first color chart in RGB values or patch size of at least a part of patches, to obtain corrected RGB values; and converting, by the color conversion apparatus, the corrected RGB values into colorimetric values by using the scanner profile.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIG. 12 illustrates a table for correcting the level of flare with respect to a patch subjected to the correction, for use in color conversion according to one embodiment of the present invention; and FIG. 13 illustrates a table for correcting the level of flare with respect to surrounding patches, for use in color conversion according to one embodiment of the present invention.

DETAILED DESCRIPTION OF EMBODIMENTS

Figure 1:
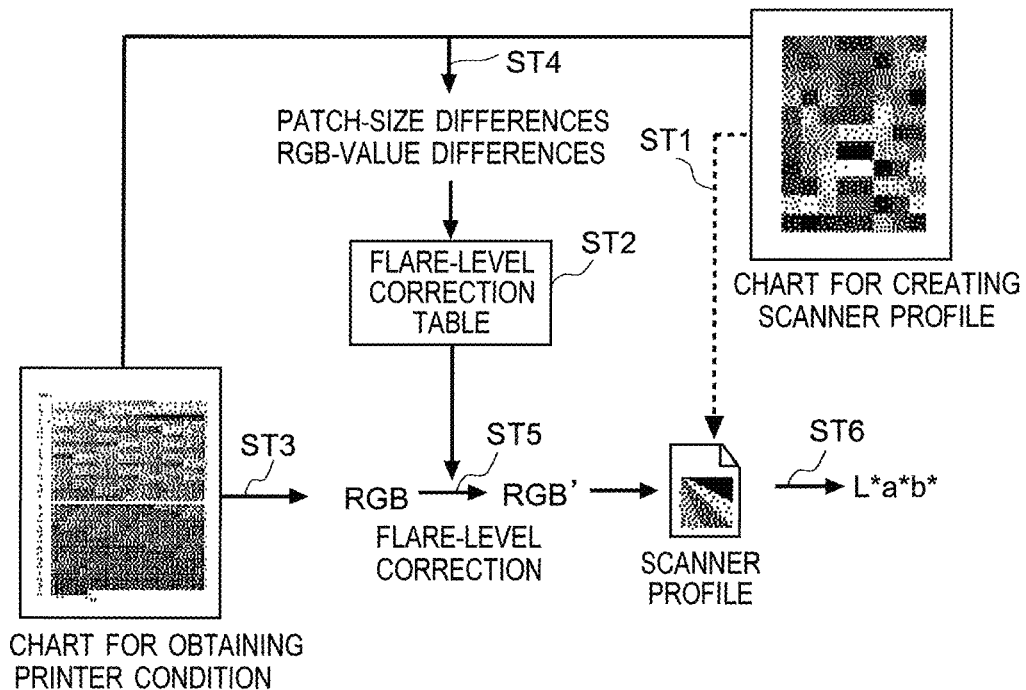
FIG. 1 is a schematic diagram for illustrating a color conversion method according to one embodiment of the present invention.

Hereinafter, one or more embodiments of the present invention will be described with reference to the drawings. However, the scope of the invention is not limited to the illustrated embodiments.

As described in the above BACKGROUND, a scanner profile is created by measuring a chart for creating a scanner profile, which was output by a printer, with a scanner and a colorimeter, and by associating RGB values obtained by measurement of the chart with the scanner with corresponding colorimetric values like L*a*b* values obtained by measurement of the chart with the colorimeter. The scanner profile is used for converting RGB values given by measurement of another chart (for example, a chart for obtaining a printer condition) with a scanner, into colorimetric values like L*a*b* values.

In measurement of a chart including an array of patches with a scanner, the degree of diffuse light (the level of flare) coming from the surrounding patches, which surround a patch being actually measured, depends on color and size of the surrounding patches. Therefore, if a chart for creating a scanner profile is different in the composition from another chart to be subjected to color conversion, such a difference makes a difference in the level of flare between at the time of measuring a chart for creating a scanner profile and at the time of measuring another chart. It damages the accuracy of color conversion using a scanner profile.

In view of that, the following operations are executed in in a printing system according to one embodiment of the present invention. The printing system includes a printer and a color conversion apparatus that converts measured RGB values given by measurement of a color chart with a scanner, into colorimetric values being L*a*b* values or XYZ values, by using a scanner profile. The color conversion apparatus is configured to perform the following operations. That is, the color conversion apparatus obtains a scanner profile created by a chart for creating a scanner profile (first color chart), creates a table to be used for correction of RGB values, and stores the table in a storage unit in advance to the correction of RGB values. In the table, correction amounts of RGB values are associated with corresponding RGB-value differences and patch-size differences. The RGB-value differences are differences of RGB values of patches in a specific chart from RGB values of patches in the chart for creating a scanner profile (first color chart). The patch-size differences are differences of sizes of patches in the specific chart from the path size of the chart for creating a scanner profile. The specific chart is a chart created by using a part of the patches in the chart for creating a scanner profile with the RGB value or patch size being changed. The correction amounts are amounts for correcting RGB values of patches, each according to the level of flare estimated for a patch in the case that the RGB value or the patch size of a certain patch has been changed. When an arbitrary chart (second chart) prepared by a user is measured, the color conversion apparatus performs color conversion as follows, so as to bring the level of flare estimated for patches in the second color chart closer to the level of flare on patches in the chart for creating a scanner profile. That is, by using the table, the color conversion apparatus corrects, measured RGB values given by measurement of patches in a second color chart which is different from the chart for creating a scanner profile (first color chart) in RGB values or patch size of at least a part of the patches in the chart, and converts the corrected RGB values into colorimetric values by using the scanner profile. For example, the color conversion apparatus calculates RGB-value differences of patches between the chart for creating a scanner profile and the second color chart and patch-size differences of patches between the chart for creating a scanner profile and the second color chart, obtains correction amounts of RGB values associated with the calculated RGB-value differences and the calculated patch-size differences, by using the table, and corrects measured RGB values of patches in the second color chart by using the correction amounts.

In the above operations, the color correction apparatus may use, as the first color chart, a color chart in which patches are arranged so that the level of flare estimated for each of the patches is uniform.

The color conversion apparatus may obtain, from the scanner, measured RGB values given by measurement of the patches in the first color chart and the second color chart with the scanner, and further obtain, from the colorimeter, measured colorimetric values given by measurement of the patches in the first color chart with the colorimeter. On obtaining the scanner profile, the color conversion apparatus may associate the measured RGB values of the patches in the first color chart obtained from the scanner, with the corresponding measured colorimetric values of the patches in the first color chart obtained from the colorimeter, to create the scanner profile.

In creating the table, the color conversion apparatus may calculate the RGB-value differences and the patch-size differences as follows. That is, the color conversion apparatus may choose a reference patch group being a group of a certain number of patches, from the first color chart; create a first plurality of patch groups by changing an RGB value of a patch located at a certain position in the reference patch group; and create a second plurality of patch groups by changing patch size of the reference patch group. Then, the color conversion apparatus may use the printer to print the specific chart in which the first plurality of patch groups and the second plurality of patch groups are arranged; and obtain measured RGB values given by measurement of patches in the specific chart with the scanner. Using the measured RGB values of patches in the specific chart, the color conversions apparatus may calculate RGB-value differences of RGB values (set RGB values) which are set to certain patches in the specific chart from the mean RGB value of the first color chart. The certain patches in the specific chart are patches in the first plurality of patch groups in the specific chart, which have been changed in RGB values in creating the first plurality of patch groups. The mean RGB value of the first color chart is given by averaging RGB values (set RGB values) which are set to all of the patches in the first color chart. The color conversions apparatus may further calculate patch-size differences of the patch sizes of the second plurality of patch groups in the specific chart from the patch size of the first color chart. After that, the color conversions apparatus may calculate a first value by subtracting a set RGB value of a patch located at the center of each of the first and second plurality of patch groups in the specific chart, from the measured RGB value of the same patch in the specific chart. The color conversions apparatus may further calculate a second value by subtracting the mean RGB value of the first color chart, from the measured RGB value of a patch located at the center of the reference patch group in the first color chart. The color conversions apparatus may subtract the first value calculated for the patch located at the center of each of the first and second plurality of patch groups, from the second value, to obtain the correction amounts of RGB values; and associate the correction amounts of RGB values with the corresponding RGB-value differences and the corresponding patch-size differences, to create the table.

In creating the table, the color conversion apparatus may create a first table by changing the RGB value of the patch located at the center of the reference patch group to RGB values, in creating the first plurality of patch groups; and further create a second table by changing an RGB value of each of patches surrounding the center patch of the reference patch group to RGB values, in creating the first plurality of patch groups. After that, the color conversion apparatus may perform color conversion by using correction amounts of RGB values obtained as follows with these tables. That is, in correcting the RGB values, the color conversion apparatus may compare set RGB values of the patches in the second color chart with the mean RGB value of the first color chart, and further compare the sizes of the patches in the second color chart with the patch size of the first color chart, to calculate RGB-value differences and patch-size differences for the patches in the second color chart. Then, the color conversion apparatus may correct the measured RGB values of patches in the second color chart, by using the correction amounts of an RGB value of each of the patches in the second color chart, obtained with the first table and the second table. For example, the color conversion apparatus may use the first table to obtain the correction amount of an RGB value of each of the patches in the second color chart, associated with the RGB-value difference and the patch-size difference, under the condition that the patch located at the center of the reference patch group is changed to the each of the patches in the second color chart. The color conversion apparatus may further use the second table to obtain the correction amounts of an RGB value of each of the patches in the second color chart, associated with the RGB-value differences and the patch-size differences, under the condition that each of the patches surrounding the patch located at the center in the reference patch group is changed to a corresponding one of patches surrounding each of the patches in the second color chart.

In the case that the reference patch group is composed of a matrix of nine patches, having three rows and three columns, in the first color chart, the color conversion apparatus may correct the measured RGB value of each of the patches in the second color chart, by using a total correction amount calculated by adding up the correction amounts obtained by using the first table and the second table for the each of the patches in the second color chart. That is, the color conversion apparatus may use the first table to obtain the correction amount of an RGB value of each of the patches in the second color chart, under the condition that an RGB value of the patch located at the center of the reference patch group is changed to the RGB value of the each of the patches in the second color chart. The color conversion apparatus may further use the second table to obtain the correction amounts of the RGB value of each of the patches in the second color chart, under the condition that an RGB value of each of eight patches surrounding the center patch of the reference patch group is changed to an RGB value of a corresponding one of eight patches surrounding the each of the patches in the second color chart. After that, the color conversion apparatus may calculate the total correction amount by adding up the correction amount with respect to the center patch and the correction amounts with respect to the eight surrounding patches, for each of the patches in the second color chart, and correct the measured RGB value of each of the patches in the second color chart, by using the total correction amount.

Figure 2:
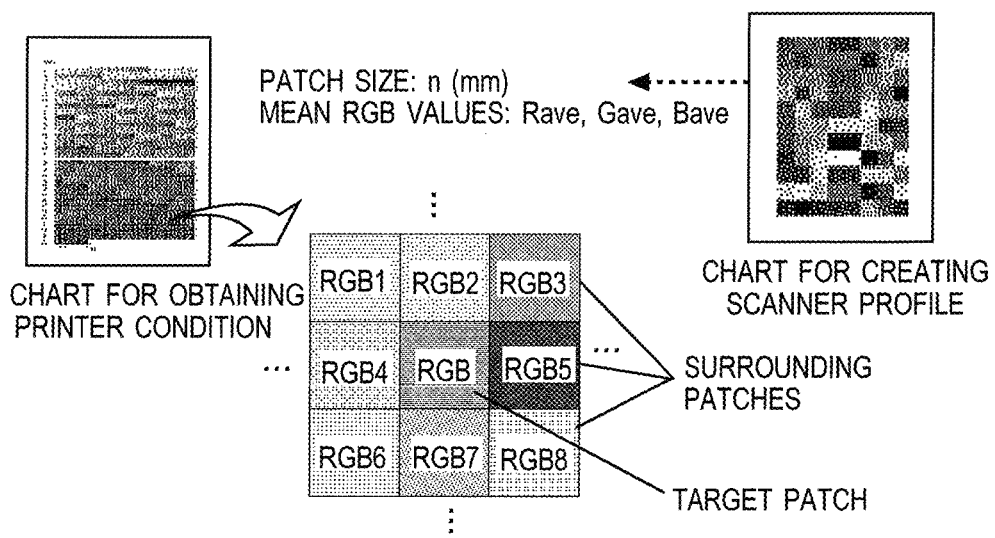
FIG. 2 is a schematic diagram for illustrating a color conversion method (correction of the level of flare) according to one embodiment of the present invention.

A concrete description is given of a color correction method for use in the above printing system, with reference to FIG. 1 and FIG. 2. FIG. 1 is a schematic diagram illustrating a color conversion method according to one embodiment of the present invention. First, the color conversion apparatus obtains measured RGB values obtained by measurement of patches in a chart for creating a scanner profile with a scanner and measured colorimetric values (L*a*b* values) obtained by measurement of patches in the chart with a colorimeter, to create a scanner profile in which the measured RGB values obtained with the scanner and corresponding measured colorimetric values obtained with the colorimeter are associated with each other (see ST1 in FIG. 1). If the scanner profile has already been created and stored in an external storage unit, the color correction apparatus may just obtain the scanner profile from the external storage unit. Next, the color conversion apparatus obtains measured RGB values given by measurement of a specific chart with the scanner, where the specific chat is a chart created by changing an RGB value or patch size of a part of the patches in the chart for creating a scanner profile and using the changed patches. The color conversion apparatus then creates and stores a flare-level correction table including correction amounts of RGB values associated with corresponding RGB-value differences and patch-size differences, which were obtained by comparing patches in the specific chart with patches in the chart for creating a scanner profile (see ST2 in FIG. 1). Next, the color conversion apparatus uses the flare-correction table to correct measured RGB values given by measurement of patches in a chart for obtaining a printer condition. In concrete terms, the color conversion apparatus obtains measured RGB values given by measurement of patches in a chart for obtaining a printer condition with the scanner (see ST3 in FIG. 1), and calculates RGB-value differences of patches in the chart for obtaining a printer condition from patches in the chart for creating a scanner profile, and patch-size differences of patches in the chart for obtaining a printer condition from the patch size of the chart for creating a scanner profile (see ST4 in FIG. 1). The color conversion apparatus then uses the flare-correction table to obtain correction amounts of RGB values associated with the calculated RGB-value differences and the calculated patch-size differences, and performs flare-level correction by correcting the measured RGB values (RGB in FIG. 1) obtained in ST3 by using the obtained correction amounts of RGB values, to obtain corrected RGB values (RGB' in FIG. 1) (see ST5 in FIG. 1). After that, the color conversion apparatus uses the scanner profile created in ST1 to convert the corrected RGB value (RGB') into L*a*b* values, and outputs the L*a*b* values (ST6 in FIG. 1).

FIG. 2 illustrates a concrete example of the flare-level correction executed in ST4 and ST5 in FIG. 1. In this example, the patch size of the chart for creating a scanner profile is indicated by n (unit: mm), and mean value of RGB values (set RGB values) which are set to all the patches in the chart for creating a scanner profile (referred to as a mean RGB value) is indicated by Rave, Gave and Bave. The color correction apparatus calculates an RGB-value difference and a patch-size difference for a patch to be corrected (the center patch of 3×3 patches, which is referred to as a target patch), where the RGB-value difference is a difference of the RGB value of the patch (the RGB value set to the patch) from the mean RGB value of the chart for creating a scanner profile (which is given by averaging RGB values set to all of the patches in the chart), and the patch-size difference is a difference of the size of the patch from the patch size of the chart for creating a scanner profile. The color correction apparatus then obtains a correction amount of an RGB value corresponding to the calculated differences, from the flare-level correction table. Next, for each of eight patches surrounding the center patch, the color correction apparatus calculates an RGB-value difference and a patch-size difference, where the RGB-value difference is a difference of the RGB value of one of the surrounding patches (the RGB value set to the patch) from the mean RGB value of the chart for creating a scanner profile, and the patch-size difference is a difference of the size of one of the surrounding patches from the patch size of the chart for creating a scanner profile. The color correction apparatus then obtains correction amounts of RGB values corresponding to the calculated differences, from the flare-level correction table. The color correction apparatus then corrects the RGB value of the target patch, by using the correction amount obtained for the target patch and the correction amounts obtained for the eight surrounding patches, to obtain a corrected RGB value (RGB') which has been corrected so as to bring the level of flare expected on the target patch close to the level of flare on the chart for creating a scanner profile.

The above-described operations can bring the level of flare estimated in measurement of a chart with a scanner in the case of obtaining the condition of a printer, close to that in the case of creating a scanner profile. It improves the measurement accuracy of a scanner, which results in an enhancement of color correction using a printer condition obtained by measurement of a chart, and in a color management with high accuracy.

Herein, in this specification, a profile means a color conversion table. Among various profiles, ICC (International Color Consortium) profiles have been widely used not only in the printing industry but also in the IT industry, and serve as a de facto standard substantially. In an ICC profile, input values in a correspondence table are defined on the basis of the lattice number. In an example that each of R, G and B values is represented by a value in the range from 0 to 255 and the lattice number is set to six, the intervals of the input values are defined by dividing 255 by 5 (the lattice number minus one). Accordingly, each of R, G and B values has any one of values of 0, 51, 102, 153, 204 and 255, and the conversion table includes $6^3$ (the cube of six) sets of input R, G and B values and corresponding sets of output colorimetric values.

EXAMPLES

Figure 3:
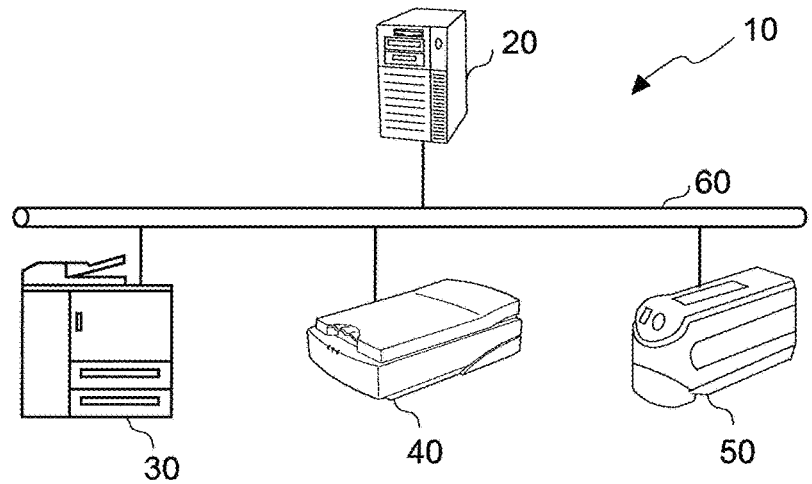
FIG. 3 is a schematic diagram for illustrating an example of a printing system according to one embodiment of the present invention.
Figure 4:
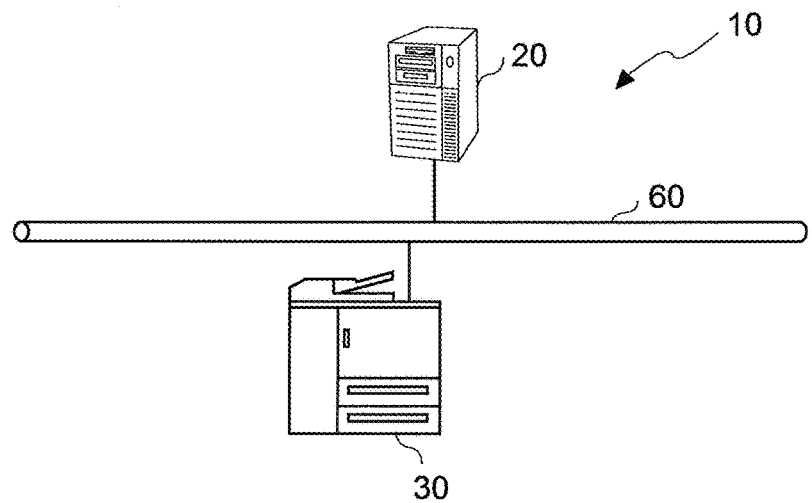
FIG. 4 is a schematic diagram for illustrating another example of a printing system according to one embodiment of the present invention.
Figure 5:
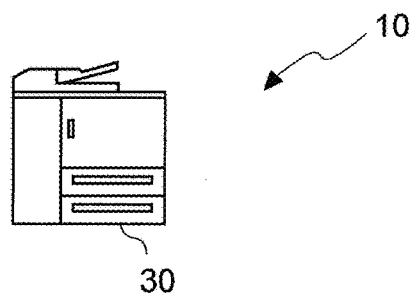
FIG. 5 is a schematic diagram for illustrating another example of a printing system according to one embodiment of the present invention.
Figure 6A:
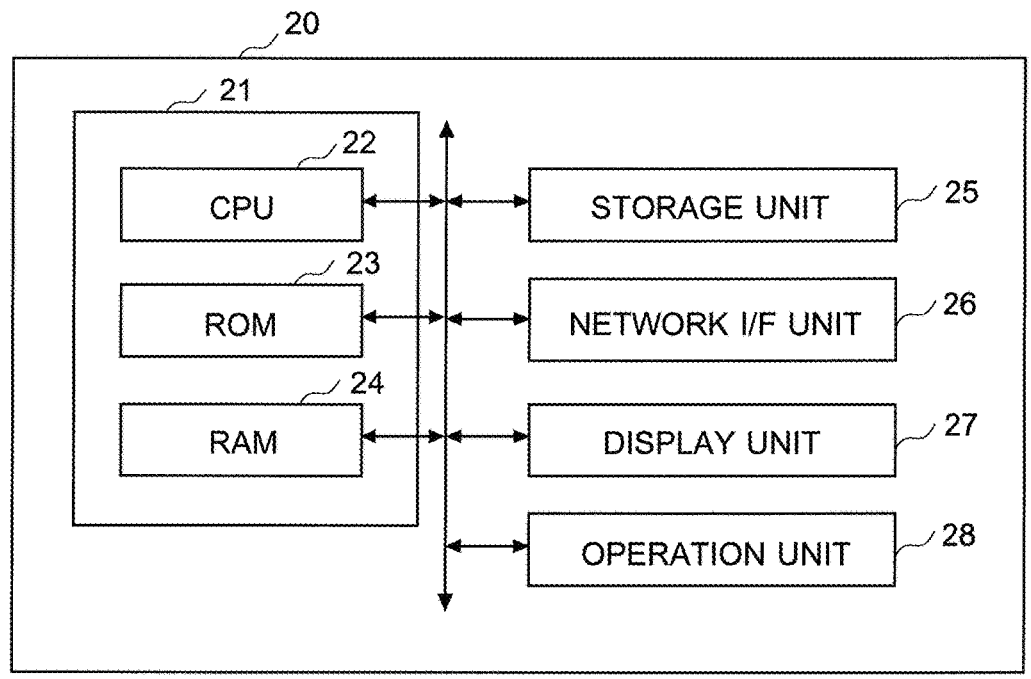
FIGS. 6A and 6B are block diagrams illustrating an example of the constitution of a color conversion apparatus according to one embodiment of the present invention.
Figure 6B:
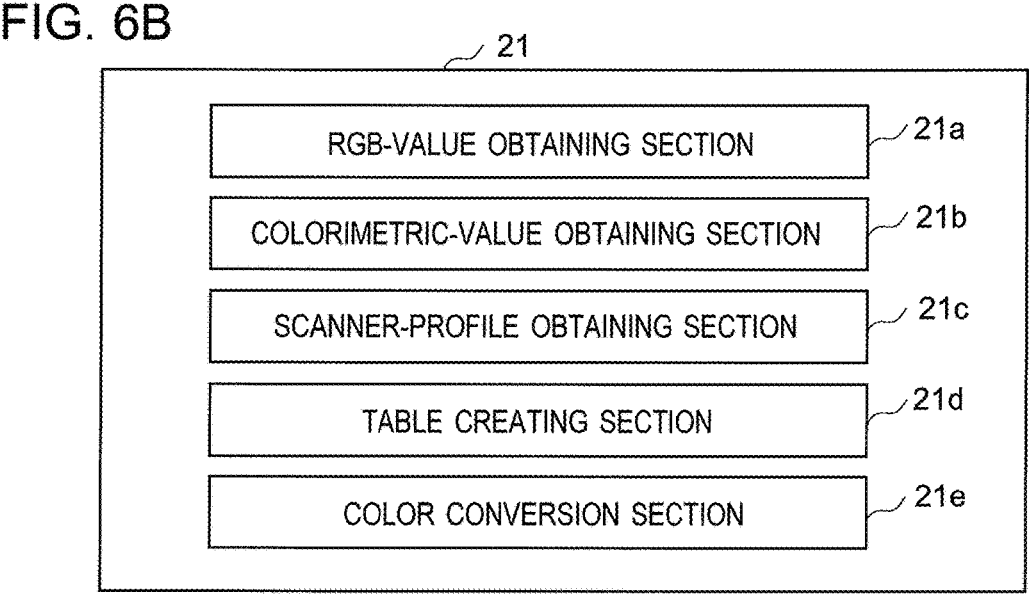
Figure 7:
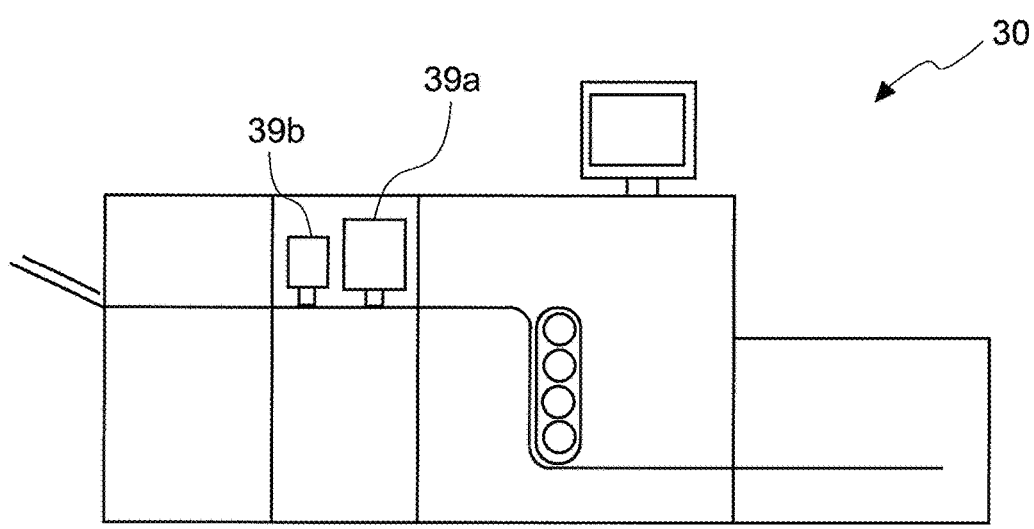
FIG. 7 is a schematic diagram illustrating an example of the constitution of a printer (in the case that the printer includes an in-line scanner and an in-line colorimeter) according to one embodiment of the present invention.

In order to describe the above-mentioned embodiments of the present invention in more detail, a description is given to a color conversion apparatus, a non-transitory recording medium storing a computer-readable program for color conversion, and a color conversion method according to one example of the present invention, with reference to FIG. 3 to FIG. 13. Each of FIGS. 3 to 5 is a schematic diagram for illustrating a example of a printing system of the present example. FIGS. 6A and 6B are block diagrams illustrating a constitution example of a color conversion apparatus of the present example. FIG. 7 and FIGS. 8A and 8B are a schematic diagram and block diagrams illustrating a constitution example of a printer (in the case that the printer includes an in-line scanner and an in-line colorimeter and an in-line colorimeter and that the control unit of the printer has functions of a color conversion apparatus) of the present example. Each of FIG. 9, FIGS. 10A and 10B and FIG. 11 is a flowchart illustrating an example of operations of the color conversion apparatus of the present example. Each of FIG. 12 and FIG. 13 illustrates an example of a flare-level correction table, for use in color conversion.

As illustrated in FIG. 3, printing system 10 of the present example includes color conversion apparatus 20, printer 30, scanner 40 and colorimeter 50. The above apparatuses are communicably connected to each other via a communication network 60, where examples of the communication network 60 include a LAN (Local Area Network) and WAN (Wide Area Network) conforming to a standard, for example, Ethernet, Token Ring, or FDDI (Fiber-Distributed Data Interface). In the printing system 10, color conversion apparatus 20 and printer 30 may be communicably connected to each other with an exclusive line supporting, for example, PCI (Peripheral Component Interconnect) communication.

Color conversion apparatus 20 is configured to obtain a scanner profile. In the scanner profile, measured color values of patches in a chart for creating a scanner profile, which was printed by printer 30, given by measurement of the chart with scanner 40 are associated with those given by measurement of the chart with colorimeter 50. Color conversion apparatus 20 is further configured to use the scanner profile to perform color conversion on measured color values of patches in another color chart, which was printed by printer 30, given by measurement of the chart with scanner 40. Examples of the chart subjected to the color conversion, include a color chart for obtaining a printer condition, a color chart for color calibration of a printer, a color chart for creating a printer profile, and a color chart for color verification. The present example employs a color chart for obtaining a printer condition as the color chart subjected to color conversion. Color conversion apparatus 20 is further configured to, on performing the color conversion, use a flare-level correction table prepared in advance, to correct RGB values according to the level of flare estimated in measurement of patches. A description will be given later of the detailed constitution of color conversion apparatus 20, creation of a scanner profile, creation of a flare-level correction table, and color conversion including correction of RGB values according to the level of flare.

Printer 30 is configured to output a chart for creating a scanner profile, a chart for obtaining a printer condition and others. A description will also be given later of the detailed constitution of printer 30.

Scanner 40 includes, for example, three kinds of sensors for RGB colors, and is configured to scan a chart for creating a scanner profile or a chart for obtaining a printer condition printed by printer 30, to output RGB values as measurement results.

Colorimeter 50 is a color measurement device supporting spectrophotometry (spectrophotometer or spectrocolorimeter) capable of measuring the light intensity at each wavelength. Colorimeter 50 is configured to measure colors of a chart for creating a scanner profile, printed with printer 30, to output colorimetric values (for example, L*a*b* values, XYZ values, or other color values in a device-independent color space) as measurement results.

Herein, FIG. 3 illustrates a construction example of printing system 10 of the present example, and its construction may be modified appropriately. For example, printing system 10 may have the construction that printer 30 includes scanner 40 and colorimeter 50, as illustrated in FIG. 4. As another example, printing system 10 may have the construction that printer 30 further includes color conversion apparatus 20, as illustrated in FIG. 5. Hereinafter, color conversion apparatus 20 and printer 30 will be described in detail.

Color Conversion Apparatus

As illustrated in FIG. 6A, color conversion apparatus 20 includes control unit 21, storage unit 25, network interface (I/F) unit 26, display unit 27 and operation unit 28.

Control unit 21 includes a CPU (Central Processing Unit) 22 as a hardware processor, and memories including ROM (Read Only Memory) 23 and RAM (Random Access Memory) 24. CPU 22 reads out control programs stored in ROM 23 or storage unit 25, loads the control programs onto RAM 24, and executes the control programs, thereby performing the whole operations of color conversion apparatus 20.

As illustrated in FIG. 6B, control unit 21 is configured to work as RGB-value obtaining section 21a, colorimetric-value obtaining section 21b, scanner-profile obtaining section 21c, table creating section 21d and color conversion section 21e.

RGB-value obtaining section 21a is configured to, in creation of a scanner profile, obtain from scanner 40 (or in-line scanner 39a of printer 30, which will be described later), measured RGB values given by measurement of patches in the chart for creating a scanner profile (first color chart). RGB-value obtaining section 21a is configured to, on using a scanner profile (on performing color conversion by using a scanner profile), obtain from scanner 40 (or in-line scanner 39a of printer 30), measured RGB values given by measurement of patches in the chart for obtaining a printer condition (second color chart).

Colorimetric-value obtaining section 21b is configured to, in creation of a scanner profile, obtain from colorimeter 50 (or in-line colorimeter 39b of printer 30, which will be described later), measured colorimetric values (L*a*b* values in the present example) given by measurement of patches in the chart for creating a scanner profile (first color chart).

Scanner-profile obtaining section 21c is configured to obtain a scanner profile, in which measured RGB values and corresponding measured colorimetric values (L*a*b* values or XYZ values) given by measurement of patches in the chart for creating a scanner profile (first color chart) printed by printer 30 are associated with each other, so as to be used for converting RGB values into corresponding colorimetric values (L*a*b* values or XYZ values). The scanner-profile obtaining section 21c may be configured to obtain a scanner profile which has been created and stored in advance, form storage unit 25 or an external storage unit, or may be configured to create a scanner profile by associating measured RGB values obtained by RGB-value obtaining section 21a with corresponding measured colorimetric values obtained by colorimetric-value obtaining section 21c.

Table creating section 21d is configured to use RGB values of patches in the chart for creating a scanner profile (first color chart) and RGB values of patches in a specific chart created by using a part of the patches in the chart for creating a scanner profile with an RGB value or patch size being changed, to create a flare-level correction table. The flare-level correction table includes correction amounts of RGB values, each of which is according to the level of flare estimated for a patch and is associated with an RGB-value difference and patch-size difference.

In concrete terms, table creating section 21d is configured to perform the following operations. Table creating section 21d chooses a reference patch group composed of a certain number of patches (for example, a matrix of nine patches, having three rows and three columns) from a color chart (for example, a chart for creating a scanner profile), where the patches in the color chart are arranged so that the level of flare estimated for each of the patches in the color chart is uniform. Table creating section 21d then creates a plurality of patch groups by gradually changing the RGB value of a patch located at a certain position in the reference patch group and further creates a second plurality of patch groups by gradually changing patch size of the reference patch group, where the patch located a certain position may be a patch located at the center of the reference patch group or one of patches surrounding the center patch. Table creating section 21d then causes printer 30 to print a specific chart in which the first plurality of patch groups and the second plurality of patch groups are arranged, and obtains measured RGB values given by measurement of patches in the specific chart with scanner 40. Next, table creating section 21d calculates RGB-value differences being differences of the RGB values (hereinafter, referred to as set RGB values) set for certain patches in patch groups in the specific chart, from the mean RGB value given by averaging set RGB values of all of the patches in the chart for creating a scanner profile (first color chart), where the certain patches are patches which have been changed in RGB values on creating the patch groups (the first plurality of patch groups). Table creating section 21d further calculates patch-size differences being differences of patch sizes of patch groups in the specific chart, which have been changed in patch size on creating the patch groups (the second plurality of patch groups), from the patch size of the chart for creating a scanner profile (first color chart). Table creating section 21d further calculates correction amounts of RGB values by the following operations and creates a flare-level correction table. For example, to calculate correction amount under the condition that the RGB value of the patch located at the center of the reference patch group is changed, table creating section 21d calculates a first value by subtracting a set RGB value of a patch which was changed in an RGB value (the center patch in this case), in each of the patch groups (patch groups created by changing the RGB value of the center patch in the reference patch group) in the specific chart, from a measured RGB value of the patch, and further calculates a second value by subtracting the mean RGB value of the chart for creating a scanner profile (first color chart), from the measured RGB value of a patch located at a certain position (the center in this case) of the reference patch group in the chart for creating a scanner profile. Table creating section 21d then subtracts the first value calculated for the center patch of each patch group in the specific chart, from the second value, to obtain a correction amount of an RGB value of the center patch of each patch group in the specific chart. After that, table creating section 21d associates the correction amount of an RGB value of the center patch of each patch group in the specific chart, with the RGB-value difference and patch-size difference of the center patch, to create the table. As another example, to calculate correction amount under the condition that the RGB value of one of patches surrounding the center patch in the reference patch group is changed, table creating section 21d calculates a first value by subtracting a set RGB value of the center patch in each of the patch groups (patch groups created by changing the RGB value of one of the surrounding patches in the reference patch group) in the specific chart, from a measured RGB value of the patch, and further calculates a second value by subtracting the mean RGB value of the chart for creating a scanner profile (first color chart), from the measured RGB value of the patch located at the center of the reference patch group in the chart for creating a scanner profile. Table creating section 21d then subtracts the first value calculated for the patch located at the center of each patch group in the specific chart, from the second value, to obtain a correction amount of an RGB value of the center patch of each patch group in the specific chart. After that, table creating section 21d associates the correction amount of an RGB value of the center patch of each patch group in the specific chart, with the RGB-value difference and patch-size difference of one of surrounding patches (a patch which was changed in an RGB value) in the each patch group in the specific chart, to create the table.

It is preferable that, on creating the flare-level correction table, table creating section 21d creates a flare-level correction table (first table) by changing an RGB value of a patch located at the center of the reference patch group to RGB values, in creating the first plurality of patch groups, and further creates another flare-level correction table (second table) by changing an RGB value of each of patches surrounding the center patch in the reference patch group to RGB values, in creating the first plurality of patch groups. After creating the flare-level correction table or tables, table creating section 21d stores the created flare-level correction table or tables in storage unit 25.

Color conversion section 21e is configured to use the flare-level correction table or tables to correct measured RGB values given by measurement of patches in a chart for obtaining the printed condition (second color chart), which is different from the chart for creating a scanner profile (first color chart) in RGB values or patch size of at least a part of the patches. Color conversion section 21e is further configured to convert the corrected RGB values into colorimetric values by using the scanner profile.

In concrete terms, color conversion section 21e is configured to perform the following operations. Color conversion section 21e compares set RGB values of patches in the chart for obtaining a printer condition (second color chart) with the mean RGB value of the chart for creating a scanner profile (first color chart) and further compares patch sizes of the patches in the chart for obtaining a printer condition (second color chart) with the patch size of the chart for creating a scanner profile (first color chart), to obtain RGB-value differences and patch-size differences for the patches in the chart for obtaining a printer condition (second color chart). Color conversion section 21e then uses the first table to obtain the correction amount of a measured RGB value of each of the patches in the chart for obtaining a printer condition (second color chart), associated with the RGB-value difference and the patch-size difference, under the condition that the patch located at the center of the reference patch group is changed to the each of the patches in the chart for obtaining a printer condition (second color chart). Color conversion section 21e further uses the second table to obtain the correction amounts of a measured RGB value each of the patches in the chart for obtaining a printer condition (second color chart), associated with the RGB-value differences and the patch-size differences, under the condition that each of the patches surrounding the patch located at the center in the reference patch group is changed to a corresponding one of patches surrounding each of the patches in the chart for obtaining a printer condition (second color chart). Color conversion section 21e then corrects the measured RGB value of each of the patches in the chart for obtaining a printer condition (second color chart), by using the correction amounts obtained with the first table and the second table. After that, color conversion section 21e converts the corrected RGB values into colorimetric values like L*a*b* values by using the scanner profile.

Herein, the above-mentioned RGB-value obtaining section 21a, colorimetric-value obtaining section 21b, scanner-profile obtaining section 21c, table creating section 21d and color conversion section 21e may be constituted as hardware devices. Alternatively, the above-mentioned RGB-value obtaining section 21a, colorimetric-value obtaining section 21b, scanner-profile obtaining section 21c, table creating section 21d and color conversion section 21e may be provided by a color conversion program which causes color conversion apparatus 20 to function as these sections when being executed by CPU 22. That is, control unit 21 may be configured to serve as the RGB-value obtaining section 21a, colorimetric-value obtaining section 21b, scanner-profile obtaining section 21c, table creating section 21d, and color conversion section 21e, when CPU 22 executes the color conversion program.

Storage unit 25 includes a HDD (Hard Disk Drive) and/or a SSD (Solid State Drive). The storage unit 25 stores programs which, when being executed, cause CPU 22 to control various sections of the color correction apparatus 20; information about processing and functions of the color conversion apparatus 20; RGB values obtained by RGB-value obtaining section 21a; colorimetric values obtained by colorimetric-value obtaining section 21b; a scanner profile created or obtained by scanner-profile obtaining section 21c; a flare-level correction table created by table creating section 21d; and other data.

Network interface unit 26 includes a NIC (Network Interface Card) and/or a modem. The network interface unit 26 connects color conversion apparatus 20 to communication network 60 so as to be communicable with printer 30, scanner 40, and colorimeter 50.

Display unit 27 includes a display, for example, a LCD (Liquid Crystal Display) or an organic EL (Electro-Luminescence) display, so as to display various kinds of screens including a screen with regard to creation of a scanner profile and a screen with regard to color conversion.

Operation unit 28 includes a device, for example, a mouse, a keyboard and/or hardware switches, and is configured to allow an operator to perform various operations including operations with regard to creation of a scanner profile and operations with regard to color conversion.

Printer

Figure 8A:
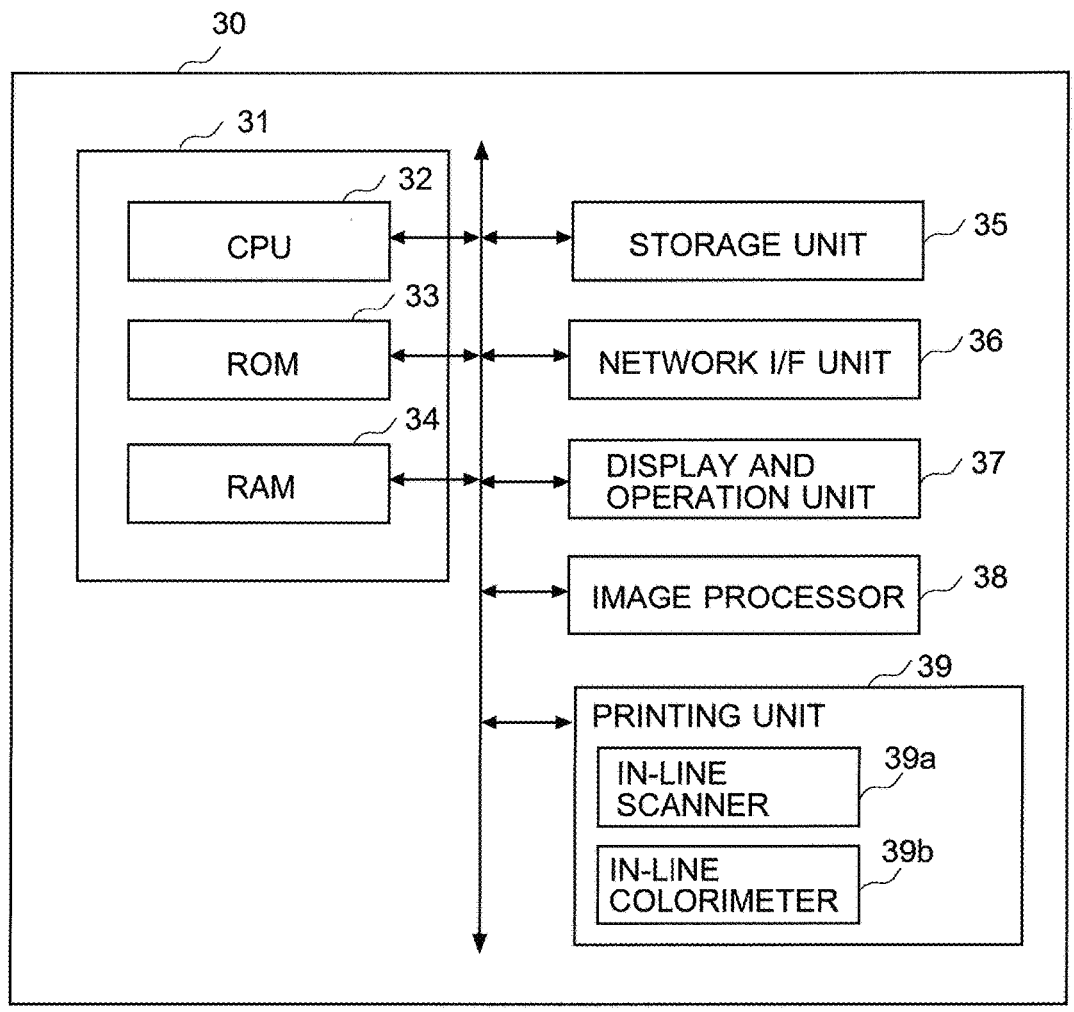
FIGS. 8A and 8B are block diagrams illustrating an example of the constitution of a printer (in the case that the printer includes an in-line scanner and an in-line colorimeter and that the control unit of the printer has functions of a color conversion apparatus) according to one embodiment of the present invention.

Printer 30 is an image forming apparatus like a MFP (Multi-Functional Peripheral), and is configured to output a chart for creating a scanner profile and a chart for obtaining a printer condition. Printer 30 includes, as illustrated in FIG. 8A, control unit 31, storage unit 35, network interface (I/F) unit 36, display and operation unit 37, image processor 38 and printing unit 39.

Figure 8B:
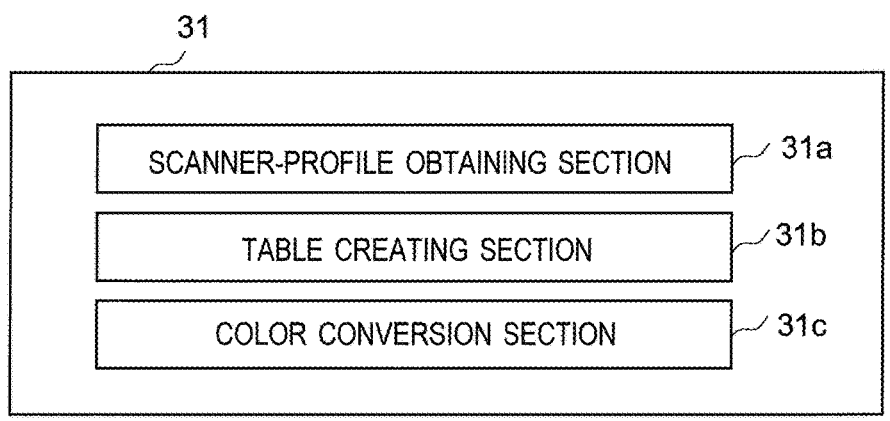

Control unit 31 includes CPU 32 and memories including ROM 33 and RAM 34. CPU 32 reads out control programs stored in ROM 33 or storage unit 35, loads the control programs onto RAM 34, and executes the control programs, thereby performing the whole operations of printer 30. If printer 30 has the functions of color conversion apparatus 20, control unit 31 further serves as scanner-profile obtaining section 31a, table creating section 31b and color conversion section 31c, as illustrated in FIG. 8B. A description of operations of the scanner-profile obtaining section 31a, table creating section 31b and color conversion section 31c is omitted because they are similar to those of scanner-profile obtaining section 21c, table creating section 21d and color conversion section 21e of color conversion apparatus 20.

Storage unit 35 includes a HDD and/or a SSD. Storage unit 35 stores programs which, when being executed, cause CPU 32 to control various sections of printer 30; information about processing and functions of the printer 30; and a printer profile, and optionally includes RGB values obtained by in-line scanner 39a; colorimetric values obtained by in-line colorimeter 39b; a scanner profile created or obtained by scanner-profile obtaining section 31a; and a flare-level correction table created by table creating section 31b.

Network interface unit 36 includes a MC and/or a modem. Network interface unit 36 connects printer 30 to communication network 60 so as to be communicable with color conversion apparatus 20.

Display and operation unit 37 is configured to display various screens relating to printing and allow an operator to perform, on the screens, various operations relating to printing. Examples of the display and operation unit 37 include a touch screen in which a pressure-sensitive operation unit (a touch sensor) composed of lattice-shaped transparent electrodes is arranged on a display unit. If printer 30 has functions of color conversion apparatus 20, display and operation unit 37 displays various screens including a screen with regard to creation of a scanner profile and a screen with regard to color conversion and allows an operator to perform, on the screens, various operations including operations with regard to creation of a scanner profile and operations with regard to color conversion.

Image processor 38 is configured to convert L*a*b* values output from color conversion apparatus 20 into CMYK values by using a printer profile, perform image processing including screening and rasterization, and transfer image data obtained after the image processing to printing unit 39. If printer 30 has the functions of color conversion apparatus 20, image processor 38 uses color conversion section 31c to execute color conversion on performing the above-described image processing.

Printing unit 39 (print engine) is configured to perform printing by using image data obtained after the image processing. In the printing unit 39, an exposure unit irradiates a photoreceptor drum, which was charged by a charging unit, with a laser beam in accordance with an image, to form latent images on the photoreceptor drum. A developing unit then develops the latent image by adhering charged toner onto the photoreceptor drum, and the developed toner image is transferred onto a transfer belt (first transfer processing), further is transferred from a transfer belt onto a sheet of paper (second transfer processing), and are fixed onto the sheet by a fixing unit. If printer 30 has functions of scanner 40 and colorimeter 50, printing unit 39 includes in-line scanner 39a and in-line colorimeter 39b.

In-line scanner 39a includes, for example, three kinds of sensors for RGB colors, and is configured to output RGB values given by measurement of an original with the RGB sensors. If printer 30 has the functions of color conversion apparatus 20, in-line scanner 59a may work as the RGB-value obtaining section.

In-line colorimeter 39b is, for example, a color measurement device supporting spectrophotometry (spectrophotometer or spectrocolorimeter) capable of measuring the light intensity at each wavelength, and is configured to output color measurement values (L*a*b* values, XYZ values, or colorimetric values in a device-independent color space) with the accuracy similar to that of an external color measurement device. If printer 30 has the functions of color conversion apparatus 20, in-line colorimeter 39b may work as the colorimetric-value obtaining section.

It should be noted that FIG. 6A to FIG. 8B illustrate color conversion apparatus 20 and printer 30 of the present example for illustrative purpose only, and the constitution and control of each of the apparatuses may be modified appropriately.

Hereinafter, a description is given to operations of color conversion apparatus 20 (or printer 30 having the functions of color conversion apparatus 20) of the present example. CPU 22 reads out a color conversion program stored in ROM 23 or storage unit 25, loads the program onto RAM 24, and executes the program, thereby performing steps of the flowcharts illustrated in FIGS. 9 to 11.

Creation of Scanner Profile

Figure 9:
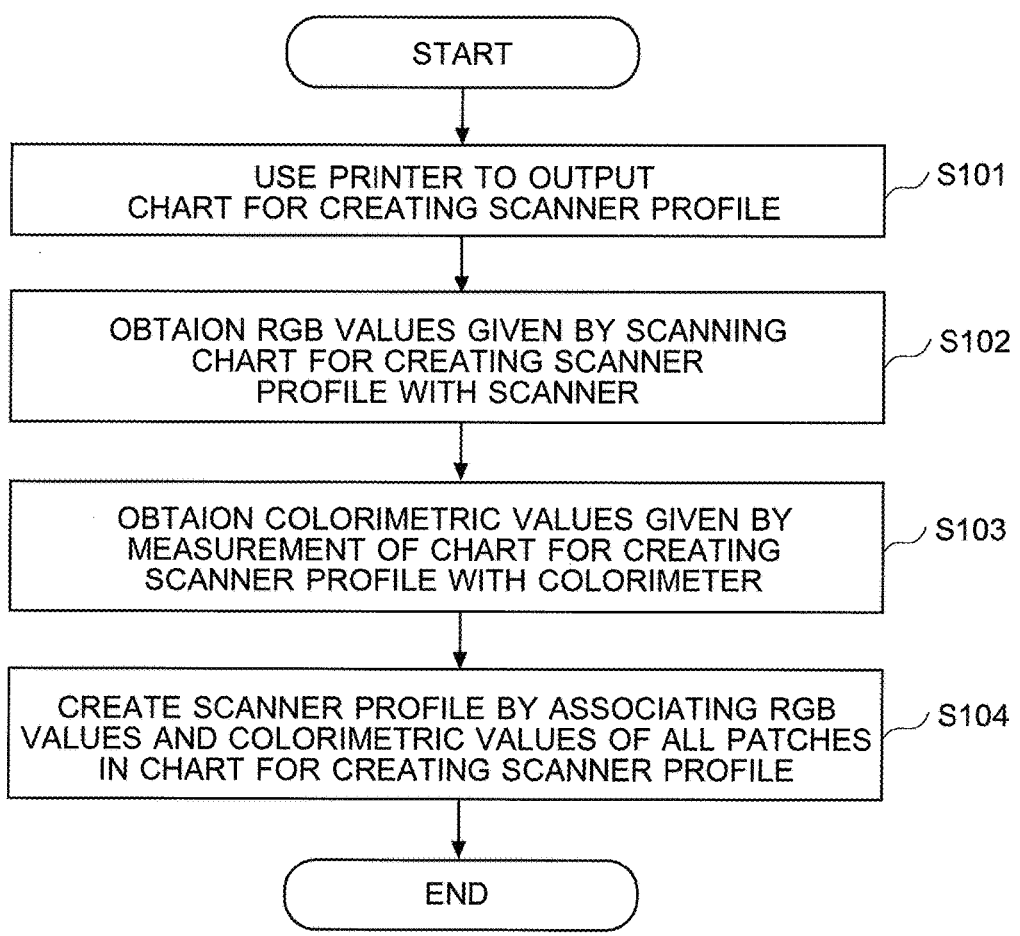
FIG. 9 is a flowchart illustrating an example of operations (creation of a scanner profile) of the color conversion apparatus according to one embodiment of the present invention.

First, a description is given of operations to create a scanner profile, with reference to the flowchart illustrated in FIG. 9. In the case that a scanner profile is prepared in advance and stored in an external storage unit, control unit 21 of color conversion apparatus 20 may obtain a scanner profile from the external storage unit, without performing the following operations.

Control unit 21 creates image data of a chart for creating a scanner profile. In the chart, patches are arranged so that the chart can provide information covering the whole color gamut of printer 30. Control unit 21 then sends the image data to printer 30, and causes the printer 30 to print the chart for creating a scanner profile (S101). In the present example, the patches in the chart for creating a scanner profile are arranged so that the level of flare estimated for each of the patches is uniform, by using the method proposed by the patent application which has already filed by the Applicant (JP-A No. 2015-41076, which corresponding to US2016/0261773A1).

Next, control unit 21 (RGB-value obtaining section 21a) obtains RGB values of all the patches in the chart for creating a scanner profile, given by scanning the chart with scanner 40 (or in-line scanner 39a of printer 30) (S102).

Next, control unit 21 (colorimetric-value obtaining section 21b) obtains colorimetric values (L*a*b* values) of all the patches in the chart for creating a scanner profile, given by measurement of the chart with colorimeter 50 (or in-line colorimeter 39b of printer 30) (S103).

Next, control unit 21 (scanner-profile obtaining section 21c) associates the RGB values and corresponding colorimetric values (L*a*b* values) of all of the patches in the chart, to create a color conversion table (a scanner profile) and store it in storage unit 25 (S104).

Creation of Table

Figure 10A:
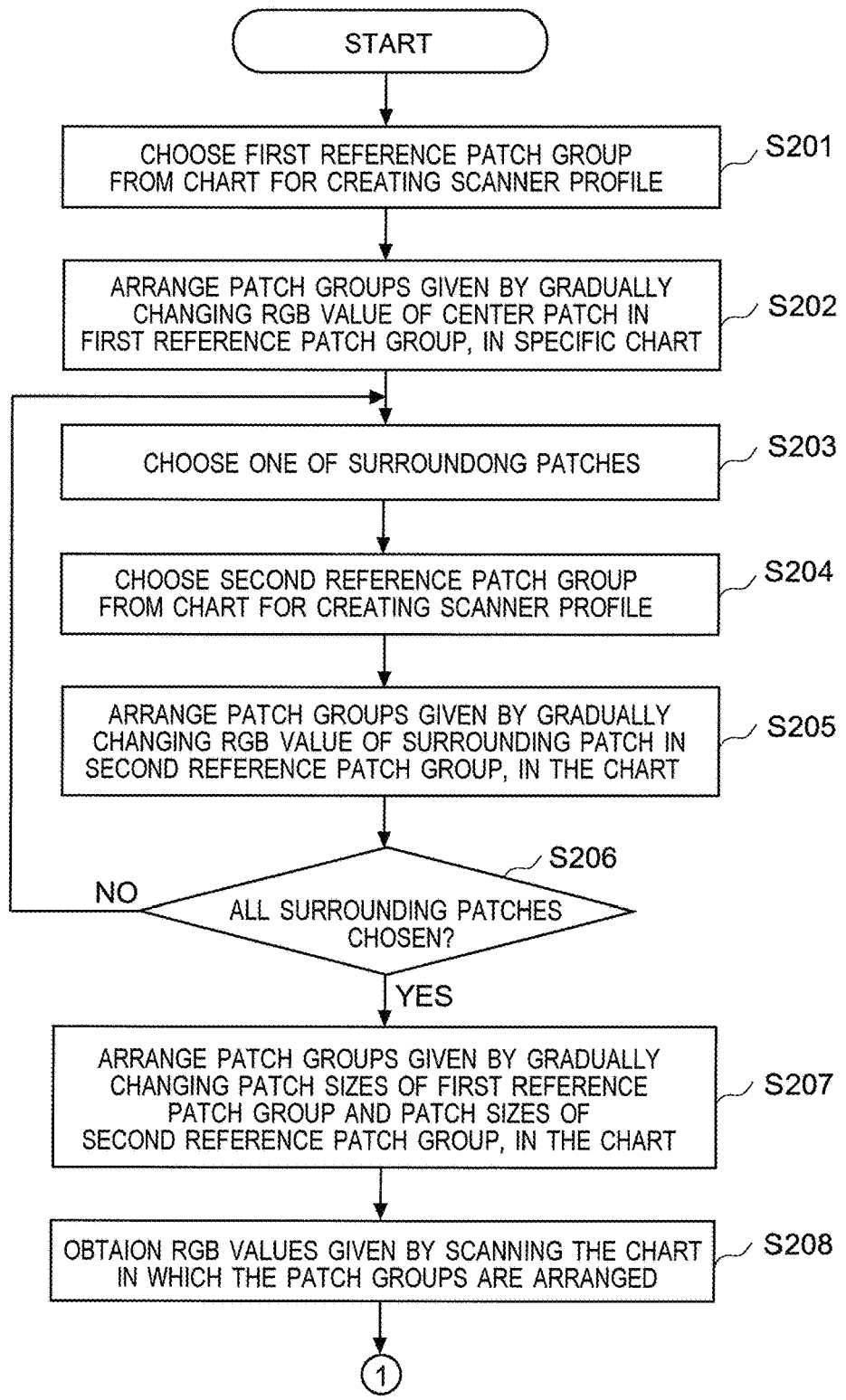
FIGS. 10A and 10B are flowcharts illustrating an example of operations (creation of a table) of the color conversion apparatus according to one embodiment of the present invention.
Figure 10B:
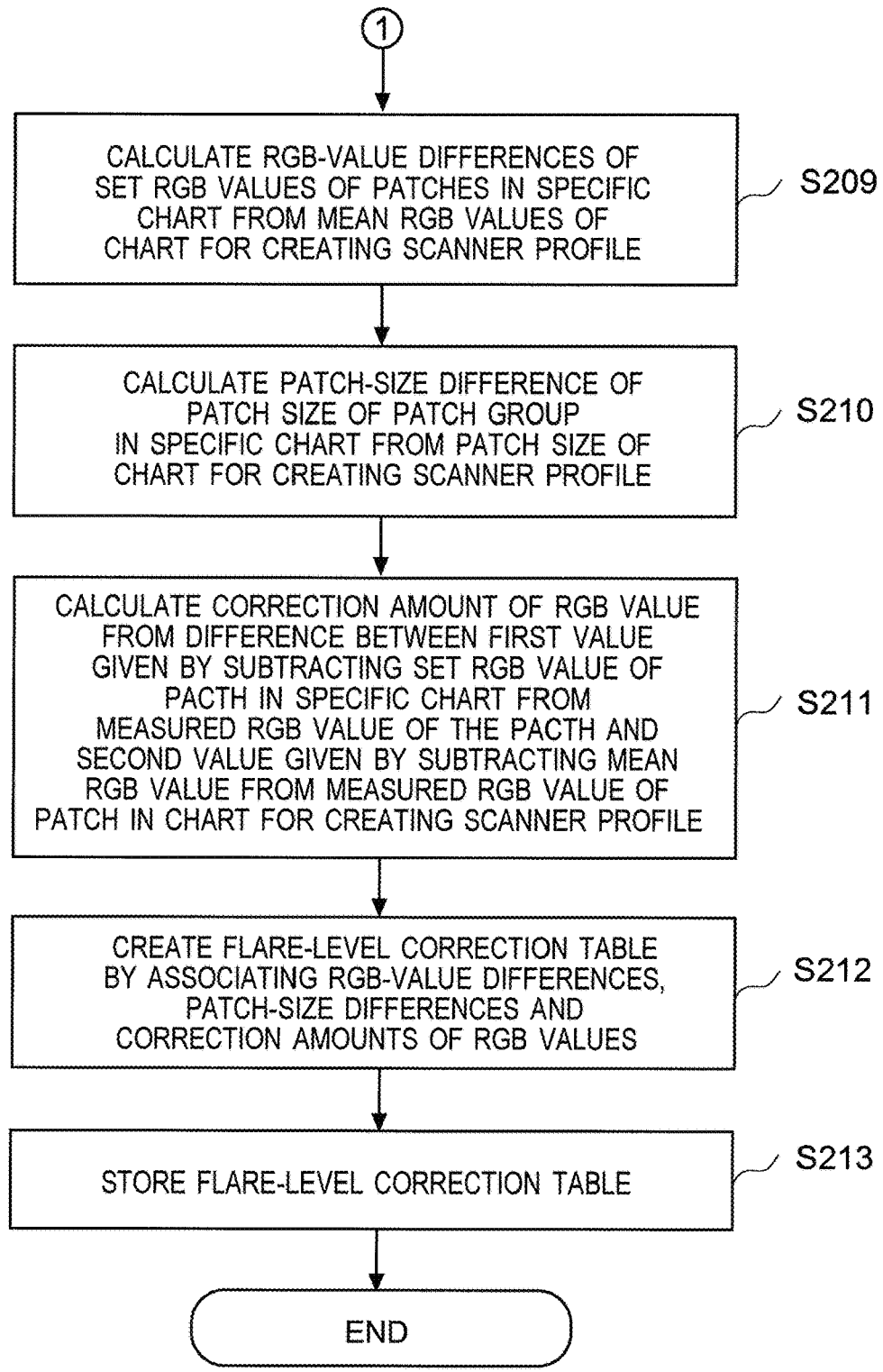

Next, a description is given of operations to create a flare-level correction table, with reference to the flowcharts which are separately illustrated in FIGS. 10A and 10B on account of space considerations.

First, as illustrated in FIG. 10A, control unit 21 (table creating section 21d) of color conversion apparatus 20 chooses a first reference patch group composed of a certain number of patches, from a chart in which the patches are arranged so that the level of flare estimated for each of the patches is uniform (S201). The present example uses a matrix of nine patches, having three rows and three columns, as the first reference patch group, and uses a chart for creating a scanner profile, as the chart from which the first reference patch group is chosen. Control unit 21 (table creating section 21d) may choose the first reference patch groups arbitrarily from the chart, because the level of flare is uniform on all the patches in the chart. However, it is preferable that the first reference patch group is chosen from an area apart from the edge of the sheet of the chart so as to reduce influence of diffuse light made by paper in the measurement of the first reference patch. It is further preferable that the first reference patch group is chosen so that the center patch of the first reference patch group has the mean RGB value of all the patches of the chart, because the RGB value of the center patch is gradually changed in the subsequent step.

Next, control unit 21 (table creating section 21d) creates a plurality of patch groups by gradually changing the RGB value of the center patch of the first reference patch group, and arranges the plurality of patch groups in a chart (S202). For example, control unit 21 (table creating section 21d) creates a plurality of patch groups by changing the RGB value of the center patch in the first reference patch group at regular intervals, and creates a specific chart in which the plurality of patch groups are arranged (or arrange the plurality of patch groups at an appropriate position in the chart for creating a scanner profile so as not to overlap with the first reference patch group in the chart).

Next, control unit 21 (table creating section 21d) chooses one of surrounding patches in the first reference patch group (S203). In this example, the first reference patch group is composed of 3×3 patches, and control unit 21 (table creating section 21d) chooses one of the surrounding patches of the top-center patch, the top-right patch, the middle-right patch, the bottom-right patch, the bottom-center patch, the bottom-left patch, the middle-left patch and the top-left patch.

Next, control unit 21 (table creating section 21d) chooses a second reference patch group composed of the certain number of patches (a matrix of nine patches, having three rows and three columns), from the chart for creating a scanner profile (S204). For example, control unit 21 (table creating section 21*d*) may choose the same patch group as the first patch groups, for the second patch group. Similarly to the above, it is preferable that the second reference patch group is chosen from an area apart from the edge of the sheet of the chart so as to reduce influence of diffuse light made by paper in the measurement of the first reference patch. It is further preferable that the second reference patch group is chosen so that one of the surrounding patches of the second reference patch group has the mean RGB value of all the patches of the chart, because the RGB value of the surrounding patch is gradually changed in the subsequent step.

Next, control unit 21 (table creating section 21*d*) creates a plurality of patch groups by gradually changing the RGB value of the surrounding patch, which has been chosen, and arranges the plurality of patch groups in the chart (S205). For example, control unit 21 (table creating section 21*d*) creates a plurality of patch groups by changing the RGB value of the surrounding patch, which has been chosen, in the second reference patch group at regular intervals, and arranges the plurality of patch groups at an appropriate position in the specific chart so as not to overlap with the patch groups created in S202 in the chart (or arranges the plurality of patch groups at an appropriate position in the chart for creating a scanner profile so as not to overlap with the first reference patch group, the second reference patch group and the patch groups created in S202 in the chart).

Next, control unit 21 (table creating section 21*d*) judges whether choice of all the surrounding patches has been completed (S206). When judging that there is an unchosen surrounding patch, control unit 21 goes back to S203, to repeat the above-described operations.

When choice of all the surrounding patches has been completed, control unit 21 (table creating section 21*d*) creates a plurality of patch groups by gradually changing the patch size of the first reference patch group and the second reference patch group without changing RGB values of the patches in these reference patch groups, and arranges the plurality of patch groups in the chart (S207). For example, control unit 21 (table creating section 21*d*) creates a plurality of patch groups by using various patch sizes prepared by increasing and/or reducing the patch size of the chart for creating a scanner profile at regular intervals, and arranges the plurality of patch groups at an appropriate position in the specific chart so as not to overlap with the patch groups created in S202 and S205 in the chart (or arranges the plurality of patch groups at an appropriate position in the chart for creating a scanner profile so as not to overlap with the first reference patch group, the second reference patch group and the patch groups created in S202 and S205 in the chart).

Next, control unit 21 (table creating section 21*d*) causes printer 30 to print the specific chart in which the plurality of patch groups created in S202, S205 and S207 (or the chart for creating a scanner profile which has been modified) are arranged. Control unit 21 (table creating section 21*d*) then causes scanner 40 (or in-line scanner 39*a* of printer 30) to scan the chart, and obtains the measured RGB values (S208)

Next, as illustrated in FIG. 10B, control unit 21 (table creating section 21*d*) calculates differences (RGB-value differences) of set RGB values of patches in the specific chart, from the mean RGB value of all the patches in the chart for creating a scanner profile (first color chart) (S209).

Control unit 21 (table creating section 21*d*) further calculates differences (patch-size differences) of the sizes of patches (or patch groups) in the specific chart from the patch size of the chart for creating a scanner profile (first color chart) (S210).

Next, control unit 21 (table creating section 21*d*) calculates a first value by subtracting a set RGB value of the center patch in each patch group arranged in the specific chart, from the measured RGB value of the center patch, and further calculates a second value by subtracting the mean RGB value of the chart for creating a scanner profile (first color chart), from the measured RGB value of the center patch in the reference patch group in the chart for creating a scanner profile (first color chart). Control unit 21 (table creating section 21*d*) then subtracts the first value calculated for the center patch in each patch group, from the second value, to obtain the correction amounts of RGB values (S211). For example, assuming that the set RGB value and the measured RGB value of the center patch in each patch group arranged in the specific chart are indicated by $RGB1\_s$ and $RGB1\_m$, respectively, the mean RGB value given by averaging set RGB values of all the patches in the chart for creating a scanner profile (first color chart) is indicated by $RGB2\_sa$, and the measured RGB value of the center patch in the reference patch group in the chart for creating a scanner profile (first color chart) is indicated by $RGB2\_m$, the value given from ($RGB1\_m - RGB1\_s$) represents the level of flare estimated for the center patch in a patch group arranged in the specific chart, and the value given from ($RGB2\_m - RGB2\_sa$) represents the level of flare estimated for the center patch in the reference patch group in the chart for creating a scanner profile (first color chart). The value given by subtracting the value of ($RGB1\_m - RGB1\_s$) from the value of ($RGB2\_m - RGB2\_sa$) represents the correction amount an RGB value of the center patch according to the level of flare estimated for the patch.

Next, control unit 21 (table creating section 21*d*) associates the correction amounts of RGB values calculated in S211 with the corresponding RGB-value differences calculated in S209 and the corresponding patch-size differences calculated in S210, to create a flare-level correction table (S212). Control unit 21 then stores the flare-level correction table in storage unit 25 (S213). In S212, control unit 21 (table creating section 21*d*) may create a first flare-level correction table including the correction amounts of an RGB value of the center patch according to the level of flare estimated in the case that the RGB value of the center patch is changed to various RGB values, and further create a second flare-level correction table including the correction amounts of an RGB value of the center patch according to the level of flare estimated in the case that the RGB value of one of the surrounding patches is changed to various RGB values.

FIG. 12 shows an example of a flare-level correction table including the correction amounts of an RGB value of the center patch according to the level of flare estimated in the case that the RGB value of the center patch is changed to various RGB values and the patch size of all the patches in a patch group including the center patch is changed to various patch sizes. In the flare-level correction table, the RGB-value differences ($\Delta R$, $\Delta G$, $\Delta B$) of set RGB values of the center patch from the mean RGB value of the chart for creating a scanner profile (first color chart), and the patch size differences ($\Delta Size$) of the patch group including the center patch from the patch size of the chart for creating a scanner profile (first color chart) are associated with the correction amounts of RGB values of the center patch ($f\Delta R$, $f\Delta G$, $f\Delta B$). FIG. 13 shows an example of another flare-level correction table including the correction amounts of an RGB value of the center patch according to the level of flare estimated in the case that the RGB value of each of the surrounding patches is changed to various RGB values and the patch size of all the patches in a patch group including the patch is changed to various patch sizes. In the flare-level correction table, the RGB-value differences ($\Delta R$, $\Delta G$, $\Delta B$) of set RGB values of the surrounding patch from the mean RGB value of the chart for creating a scanner profile (first color chart), and the patch size differences ($\Delta$Size) of the patch group including the surrounding patch from the patch size of the chart for creating a scanner profile (first color chart) are associated with the correction amounts of RGB values of the center patch (g$\Delta R$, g$\Delta G$, g$\Delta B$).

Color Conversion

Figure 11:
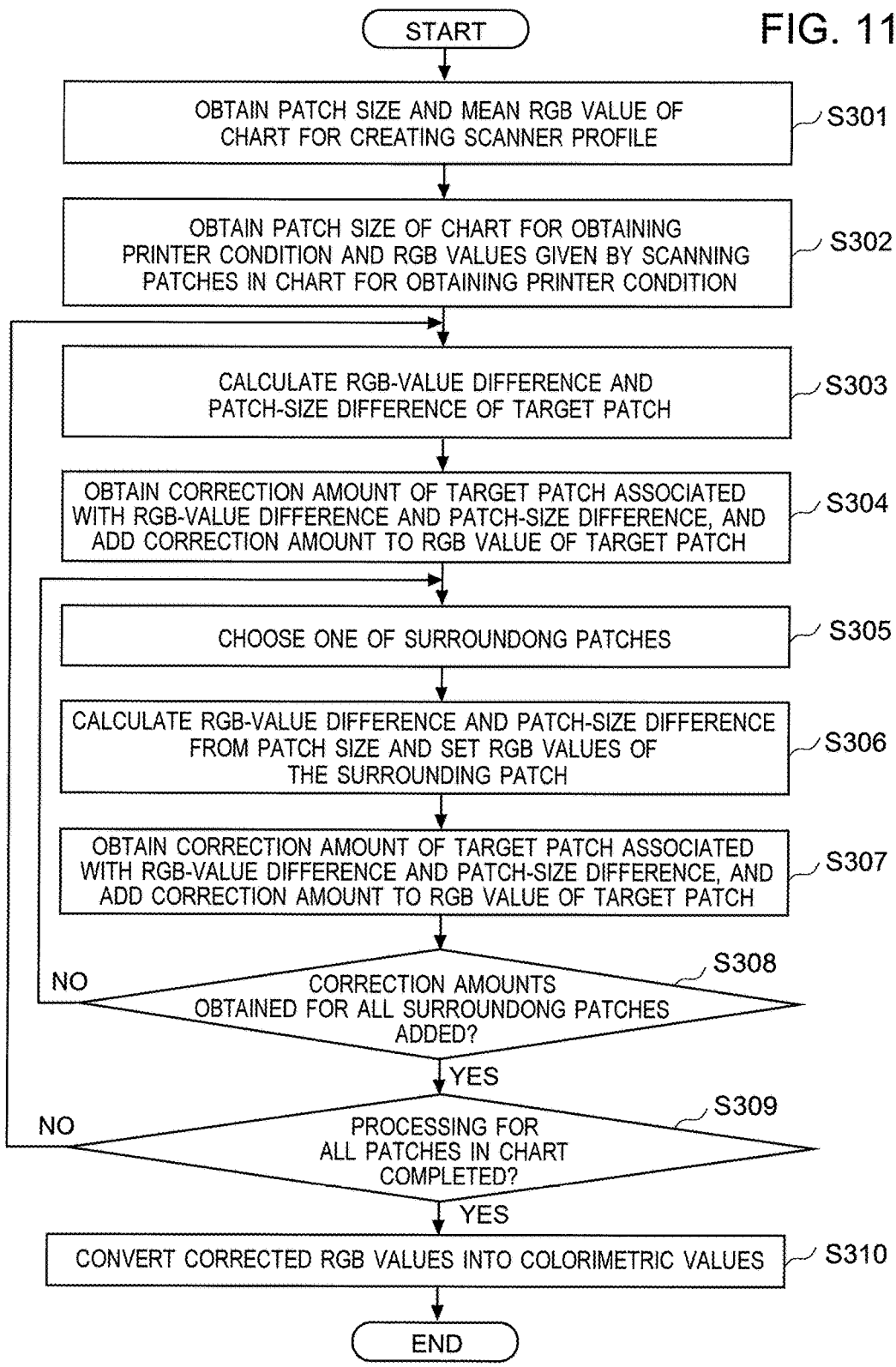
FIG. 11 is a flowchart illustrating an example of operations (color conversion) of the color conversion apparatus according to one embodiment of the present invention.

Next, a description is given of operations to perform color conversion by using the flare-level correction table or tables created in the above-described flow, with reference to the flowchart illustrated in FIG. 11.

First, control unit 21 (color conversion section 21e) of color conversion apparatus 20 analyzes data or measurements of the chart of creating a scanner profile, to obtain the patch size (n) of the chart for creating a scanner profile and the mean RGB value (Rave, Gave, Bave) given by averaging set RGB values of all the patches in the chart (S301).

Next, control unit 21 (color conversion section 21e) obtains the patch size (m) of the chart for obtaining a printer condition and further obtains RGB values (indicated by R, G, B in the following mathematical expressions) obtained by scanning the chart with scanner 40 (or in-line scanner 30a of printer 30) (S302). Control unit 21 (color conversion section 21e) may obtain the patch size (m) by analyzing the data of the chart for obtaining a printed condition or analyzing the measurements of the chart for obtaining a printed condition.

Next, control unit 21 (color conversion section 21e) obtains a correction amount of an RGB value of each of the patches in the chart for obtaining a printer condition on the assumption that the patch located at the center of the reference patch group is changed to the each of the patches in the second color chart, and further obtains the correction amounts of an RGB value of each of the patches in the chart on the assumption that each of the patches surrounding the center patch in the reference patch group is changed to a corresponding one of patches surrounding each of the patches in the second color chart. Control unit 21 (color conversion section 21e) then corrects the measured RGB value of each of the patches in the chart for obtaining a printer condition, by using the correction amounts obtained for the each of the patches in the chart.

In concrete terms, control unit 21 (color conversion section 21e) calculates the RGB-value differences ($\Delta R$=R−Rave, $\Delta G$=G−Gave, $\Delta B$=B−Bave) and the patch size differences ($\Delta$Size=m−n), for a patch to be corrected (also referred to as a target patch) in the chart for obtaining a printer condition (S303).

Next, control unit 21 (color conversion section 21e) uses the flare-level correction table created by changing the RGB value of the center patch to various RGB values (see FIG. 12), to obtain the correction amount of an RGB value associated with the RGB-value difference and the patch-size difference of the patch to be corrected (target patch). Control unit 21 (color conversion section 21e) then adds the obtained correction amount (=f($\Delta R$, $\Delta G$, $\Delta B$, $\Delta$Size)) to the RGB value (R, G, B) of the target patch (R, G, B) (S304). In other words, control unit 21 (color conversion section 21e) calculates (R, G, B)=(R, G, B)+f($\Delta R$, $\Delta G$, $\Delta B$, $\Delta$Size).

Next, control unit 21 (color conversion section 21e) chooses one of patches surrounding the target patch (S305), and calculates the RGB-value differences ($\Delta R$=R−Rave, $\Delta G$=G−Gave, $\Delta B$=B−Bave) and the patch size differences ($\Delta$Size=m−n), for the surrounding patch chosen in the above step (S306).

Next, control unit 21 (color conversion section 21e) uses the flare-level correction table created by changing the RGB value of each of the surrounding patches to various RGB values (see FIG. 13), to obtain the correction amount of an RGB value associated with the RGB-value difference and the patch-size difference of the surrounding patch chosen in the above step. Control unit 21 (color conversion section 21e) then adds the obtained correction amount (=g($\Delta R$, $\Delta G$, $\Delta B$, $\Delta$Size)) to the RGB value (R, G, B) of the target patch (R, G, B) (S307). In other words, control unit 21 (color conversion section 21e) calculates (R, G, B)=(R, G, B)+g($\Delta R$, $\Delta G$, $\Delta B$, $\Delta$Size).

Next, control unit 21 (color conversion section 21e) judges whether the correction amounts calculated for all the surrounding patches have been added to the RGB value of the target patch (S308). When judging that there is any surrounding patch such that the correction amount obtained for the patch has not been added the RGB value of the target patch, control unit 21 goes back to S305 and repeats the above-described operations.

When judging that the correction amounts calculated for all the surrounding patches have been added, control unit 21 (color conversion section 21e) judges whether the flare-level correction has been completed for all the patches in the chart for obtaining a printer condition (S309). On judging that there is any uncorrected patch, control unit 21 goes back to S303 and repeats the above-described operations. When judging that the flare-level correction has been completed for all the patches in the chart, control unit 21 (color conversion section 21e) uses the scanner profile to convert the corrected RGB values into colorimetric values (S310), and terminates the series of operations regarding the color conversion.

As described above, the color conversion apparatus is configured to perform color conversion on an arbitral color chart by using a scanner profile. In concrete terms, the color conversion apparatus obtains a scanner profile prepared on the basis of a chart for creating a scanner profile (first color chart), and creates a flare-level conversion table in advance to color conversion. To create the flare-level conversion table, the color conversion apparatus creates a specific chart by using a part of the patches in the chart for creating a scanner profile with an RGB values or patch size being changed (for example, by using patch groups created by changing the RGB value of one of the center patch and surrounding patches in a reference patch group chosen from the chart for creating a scanner profile, and/or using patch groups created by changing the patch size of a reference patch group chosen from the chart for creating a scanner profile) and obtains the measured RGB values of patches in the specific chart. The color conversion apparatus then uses RGB values of patches in the chart for creating a scanner profile and RGB values of patches in the specific chart, to create a flare-level conversion table in which a correction amount of an RGB value according to the level of flare estimated for each patch is associated with an RGB-value difference and a patch-size difference. After that, when an arbitrary chart prepared by a user (a second color chart which is different from the chart for creating a scanner profile in RGB values or patch size of at least a part of patches) is measured, the color conversion apparatus obtains the measured RGB values of patches in the second color chart, and uses the flare-level correction table to obtain correction amounts associated with the RGB-value differences and the patch-size differences of patches in the second color chart from those of the chart for creating a scanner profile. The color conversion apparatus then corrects the measured RGB values of patches in the second color chart, by using the obtained correction amounts, and coverts the corrected RGB values into colorimetric values. It allows the color conversion apparatus to properly correct the level of flare occurring in measurement of a chart and thereby improves the accuracy of color conversion, even if the chart is different in composition from the chart for creating a scanner profile.

The present invention should not be limited to the description in the above-mentioned examples, and the constitution and control of the system and each apparatus may be modified appropriately unless the modification deviates from the intention of the present invention.

For example, in one of the above-mentioned examples, the description has been given to the case where the color conversion apparatus chooses a group of 3×3 patches (nine patches) as the reference patch group. Alternatively, as the reference patch group, the color conversion apparatus may choose a group of five patches including the center patch, the top-center patch, the middle-right patch, the bottom-center patch and the middle-left patch, because influence of light coming from the top-right patch, the bottom-right patch, the bottom-left patch and the top left patch is smaller than that of the top-center patch, the middle-right patch, the bottom-center patch and the middle-left patch. Further, when using scanner 40 (or in-line scanner 39a) which is sensitive to diffuse light coming from surrounding patches, the color conversion apparatus may choose a greater patch group (for example, a group of 5×5 patches) than a group of 3×3 patches, as the reference patch group.

As another example, in one of the above-mentioned examples, the description has been given to the case where the color conversion apparatus performs creation of a scanner profile and color conversion by using the created scanner profile. Alternatively, the above-described color conversion method may be applied similarly to creation of a scanner profile and color conversion both executed by printer 30.

The flare-level correction tables shown in FIG. 12 and FIG. 13 are given for illustrative purpose only, and the construction of the flare-level correction table and the calculation method of each item in the table are not limited to those in the above descriptions. For example, the above descriptions give the calculation method of correction amounts of RGB values such that the color conversion apparatus calculates a first value by subtracting a set RGB value of a patch located at the center of each patch group in the specific chart, from a measured RGB value of the same patch, further calculates a second value by subtracting the mean RGB value of the chart for creating a scanner profile (first color chart), from a measured RGB value of a patch located at the center of the reference patch group in the chart for creating a scanner profile, and subtracts the first value calculated for the center patch in each patch group from the second value, to obtain the correction amounts of RGB values. However, the calculation method of correction amounts of RGB values may be modified appropriately as far as the color correction by using correction amounts of RGB values calculated by the modified calculation method can bring the level of flare estimated in an RGB value of each patch in an arbitrary chart like a chart for obtaining a printer condition (second color chart) close to the level of flare occurring in measurement of a chart for creating a scanner profile (first color chart).

The present invention is applicable to color conversion apparatuses that correct measured color values of a chart in consideration with the level of flare which occurs in measurement of the chart and perform color conversion of the corrected color values, color conversion programs to be executed in such a color conversion apparatus, non-transitory recording media each storing such a color conversion program, and color conversion methods for use in such a color conversion apparatus.

Although embodiments of the present invention have been described and illustrated in detail, it is clearly understood that the same is by way of illustration and example only and not limitation, the scope of the present invention should be interpreted by terms of the appended claims.

The invention claimed is:

1. A color conversion apparatus for converting measured RGB values given by measurement of a color chart printed by a printer, into colorimetric values being L*a*b* values or XYZ values, the color conversion apparatus comprising:
   a storage unit; and
   a hardware processor that performs:
      obtaining a scanner profile in which measured RGB values and corresponding measured colorimetric values given by measurement of patches in a first color chart printed by the printer are associated with each other;
      creating a table on a basis of RGB values of patches in the first color chart and RGB values of patches in a specific chart created by using a part of the patches in the first color chart with an RGB value or patch size being changed, wherein the table includes correction amounts of RGB values, each according to a level of flare estimated for a patch and each associated with an RGB-value difference and a patch-size difference;
      storing the table in the storage unit;
      correcting, by using the table, measured RGB values given by measurement of patches in a second color chart which is different from the first color chart in RGB values or patch size of at least a part of patches, to obtain corrected RGB values; and
      converting the corrected RGB values into colorimetric values by using the scanner profile.

2. The color conversion apparatus of claim 1,
   wherein the color conversion apparatus is communicably connected with a scanner and a colorimeter,
   the hardware processor further performs:
      obtaining, from the scanner, measured RGB values given by measurement of the patches in the first color chart with the scanner and measured RGB values given by measurement of the patches in the second color chart with the scanner;
      obtaining, from the colorimeter, measured colorimetric values given by measurement of the patches in the first color chart with the colorimeter; and
      in the obtaining the scanner profile, associating the measured RGB values of the patches in the first color chart obtained from the scanner, with the corresponding measured colorimetric values of the patches in the first color chart obtained from the colorimeter, to create the scanner profile.

3. The color conversion apparatus of claim 1,
wherein the hardware processor further performs, in the creating the table:
- choosing a reference patch group being a group of a certain number of patches, from the first color chart;
- creating a first plurality of patch groups by changing an RGB value of a patch located at a certain position in the reference patch group and creating a second plurality of patch groups by changing patch size of the reference patch group;
- causing the printer to print the specific chart in which the first plurality of patch groups and the second plurality of patch groups are arranged;
- obtaining measured RGB values given by measurement of patches in the specific chart with the scanner;
- calculating RGB-value differences of set RGB values of patches in the specific chart from a mean RGB value of the first color chart, the patches in the specific chart being patches in the first plurality of patch groups in the specific chart and having been changed in RGB values in creating the first plurality of patch groups, the mean RGB value being given by averaging set RGB values of all of the patches in the first color chart;
- calculating patch-size differences of patch sizes of the second plurality of patch groups in the specific chart from patch size of the first color chart;
- calculating a first value by subtracting a set RGB value of a patch located at a center of each of the first and second plurality of patch groups in the specific chart, from the measured RGB value of the patch located at the center of each of the first and second plurality of patch groups in the specific chart;
- calculating a second value by subtracting the mean RGB value of the first color chart, from the measured RGB value of a patch located at a center of the reference patch group in the first color chart;
- subtracting the first value calculated for the patch located at the center of each of the first and second plurality of patch groups, from the second value, to obtain the correction amounts of RGB values; and
- associating the correction amounts of RGB values with the corresponding RGB-value differences and the corresponding patch-size differences, to create the table.

4. The color conversion apparatus of claim 3,
wherein the hardware processor further performs, in the creating the table:
- creating a first table by changing the RGB value of the patch located at the center of the reference patch group to RGB values, in the creating the first plurality of patch groups; and
- creating a second table by changing an RGB value of each of patches surrounding the patch located at the center of the reference patch group to RGB values, in the creating the first plurality of patch groups, and wherein the hardware processor further performs, in the correcting the RGB values:
- comparing set RGB values of the patches in the second color chart with the mean RGB value of the first color chart and further comparing sizes of the patches in the second color chart with the patch size of the first color chart, to calculate RGB-value differences and patch-size differences for the patches in the second color chart; and
- correcting the measured RGB values given by measurement of patches in the second color chart with the scanner, by
- using the first table to obtain the correction amount of an RGB value of each of the patches in the second color chart, associated with the RGB-value difference and the patch-size difference under a condition that the patch located at the center of the reference patch group is changed to the each of the patches in the second color chart,
- using the second table to obtain the correction amounts of an RGB value of each of the patches in the second color chart, associated with the RGB-value differences and the patch-size differences under a condition that each of the patches surrounding the patch located at the center in the reference patch group is changed to a corresponding one of patches surrounding each of the patches in the second color chart, and
- correcting the measured RGB value of each of the patches in the second color chart, by using the correction amounts obtained with the first table and the second table for the each of the patches in the second color chart.

5. The color conversion apparatus of claim 4,
wherein the reference patch group is composed of a matrix of nine patches, having three rows and three columns, in the first color chart, and
the hardware processor further performs, in the correcting the RGB values:
- using the first table to obtain the correction amount of an RGB value of each of the patches in the second color chart, under a condition that an RGB value of the patch located at the center of the reference patch group is changed to the RGB value of the each of the patches in the second color chart;
- using the second table to obtain the correction amounts of the RGB value of each of the patches in the second color chart, under a condition that an RGB value of each of eight patches surrounding the patch located at the center of the reference patch group is changed to an RGB value of a corresponding one of eight patches surrounding the each of the patches in the second color chart; and
- correcting the measured RGB value of each of the patches in the second color chart, by using a total correction amount calculated by adding up the correction amounts obtained by using the first table and the second table for the each of the patches in the second color chart.

6. The color conversion apparatus of claim 1,
wherein the patches in the first color chart are arranged so that a level of flare estimated for each of the patches in the first color chart is uniform.

7. The color conversion apparatus of claim 1,
wherein the scanner is an in-line scanner in the printer, the colorimeter is an in-line colorimeter in the printer, and the color conversion apparatus is included in the printer.

8. A non-transitory recording medium storing a computer-readable program for color conversion to be executed in an apparatus that converts measured RGB values given by measurement of a color chart printed by a printer, into colorimetric values being L*a*b* values or XYZ values, the program comprising instructions which, when executed by a hardware processor of the apparatus, cause the apparatus to perform operations comprising:

obtaining a scanner profile in which measured RGB values and corresponding measured colorimetric values given by measurement of patches in a first color chart printed by the printer are associated with each other;

creating a table on a basis of RGB values of patches in the first color chart and RGB values of patches in a specific chart created by using a part of the patches in the first color chart with an RGB value or patch size being changed, wherein the table includes correction amounts of RGB values, each according to a level of flare estimated for a patch and each associated with an RGB-value difference and a patch-size difference;

storing the table in a storage unit of the apparatus;

correcting, by using the table, measured RGB values given by measurement of patches in a second color chart which is different from the first color chart in RGB values or patch size of at least a part of patches, to obtain corrected RGB values; and converting the corrected RGB values into colorimetric values by using the scanner profile.

9. The non-transitory recording medium of claim 8,
wherein the apparatus is communicably connected with a scanner and a colorimeter,
the operations further comprise:
obtaining, from the scanner, measured RGB values given by measurement of the patches in the first color chart with the scanner and measured RGB values given by measurement of the patches in the second color chart with the scanner; and
obtaining, from the colorimeter, measured colorimetric values given by measurement of the patches in the first color chart with the colorimeter, and
the obtaining the scanner profile includes associating the measured RGB values of the patches in the first color chart obtained from the scanner, with the corresponding measured colorimetric values of the patches in the first color chart obtained from the colorimeter, to create the scanner profile.

10. The non-transitory recording medium of claim 8,
wherein the creating the table includes:
choosing a reference patch group being a group of a certain number of patches, from the first color chart;
creating a first plurality of patch groups by changing an RGB value of a patch located at a certain position in the reference patch group and creating a second plurality of patch groups by changing patch size of the reference patch group;
causing the printer to print the specific chart in which the first plurality of patch groups and the second plurality of patch groups are arranged;
obtaining measured RGB values given by measurement of patches in the specific chart with the scanner;
calculating RGB-value differences of set RGB values of patches in the specific chart from a mean RGB value of the first color chart, the patches in the specific chart being patches in the first plurality of patch groups in the specific chart and having been changed in RGB values in creating the first plurality of patch groups, the mean RGB value being given by averaging set RGB values of all of the patches in the first color chart;
calculating patch-size differences of patch sizes of the second plurality of patch groups in the specific chart from patch size of the first color chart;
calculating a first value by subtracting a set RGB value of a patch located at a center of each of the first and second plurality of patch groups in the specific chart, from the measured RGB value of the patch located at the center of each of the first and second plurality of patch groups in the specific chart;
calculating a second value by subtracting the mean RGB value of the first color chart, from the measured RGB value of a patch located at a center of the reference patch group in the first color chart;
subtracting the first value calculated for the patch located at the center of each of the first and second plurality of patch groups, from the second value, to obtain the correction amounts of RGB values; and
associating the correction amounts of RGB values with the corresponding RGB-value differences and the corresponding patch-size differences, to create the table.

11. The non-transitory recording medium of claim 10,
wherein the creating the table includes:
creating a first table by changing the RGB value of the patch located at the center of the reference patch group to RGB values, in the creating the first plurality of patch groups; and
creating a second table by changing an RGB value of each of patches surrounding the patch located at the center of the reference patch group to RGB values, in the creating the first plurality of patch groups, and
wherein the correcting the RGB values includes:
comparing set RGB values of the patches in the second color chart with the mean RGB value of the first color chart and further comparing sizes of the patches in the second color chart with the patch size of the first color chart, to calculate RGB-value differences and patch-size differences for the patches in the second color chart; and
correcting the measured RGB values given by measurement of patches in the second color chart with the scanner, by
using the first table to obtain the correction amount of an RGB value of each of the patches in the second color chart, associated with the RGB-value difference and the patch-size difference under a condition that the patch located at the center of the reference patch group is changed to the each of the patches in the second color chart,
using the second table to obtain the correction amounts of an RGB value of each of the patches in the second color chart, associated with the RGB-value differences and the patch-size differences under a condition that each of the patches surrounding the patch located at the center in the reference patch group is changed to a corresponding one of patches surrounding each of the patches in the second color chart, and
correcting the measured RGB value of each of the patches in the second color chart, by using the correction amounts obtained with the first table and the second table for the each of the patches in the second color chart.

12. The non-transitory recording medium of claim 11,
wherein the reference patch group is composed of a matrix of nine patches, having three rows and three columns, in the first color chart, and
the correcting the RGB values includes:
using the first table to obtain the correction amount of an RGB value of each of the patches in the second color chart, under a condition that an RGB value of the patch located at the center of the reference patch group is changed to the RGB value of the each of the patches in the second color chart;

using the second table to obtain the correction amounts of the RGB value of each of the patches in the second color chart, under a condition that an RGB value of each of eight patches surrounding the patch located at the center of the reference patch group is changed to an RGB value of a corresponding one of eight patches surrounding the each of the patches in the second color chart; and correcting the measured RGB value of each of the patches in the second color chart, by using a total correction amount calculated by adding up the correction amounts obtained by using the first table and the second table for the each of the patches in the second color chart.

13. The non-transitory recording medium of claim 8, wherein the patches in the first color chart are arranged so that a level of flare estimated for each of the patches in the first color chart is uniform.

14. A color conversion method for use in a printing system including a printer and a color conversion apparatus that converts measured RGB values given by measurement of a color chart printed by a printer, into colorimetric values being L*a*b* values or XYZ values, the method comprising:

obtaining, by the color conversion apparatus, a scanner profile in which measured RGB values and corresponding measured colorimetric values given by measurement of patches in a first color chart printed by the printer are associated with each other;

creating a table by the color conversion apparatus on a basis of RGB values of patches in the first color chart and RGB values of patches in a specific chart created by using a part of the patches in the first color chart with an RGB value or patch size being changed, wherein the table includes correction amounts of RGB values, each according to a level of flare estimated for a patch and each associated with an RGB-value difference and a patch-size difference;

storing, by the color conversion apparatus, the table in a storage unit of the color conversion apparatus;

correcting, by the color conversion apparatus, by using the table, measured RGB values given by measurement of patches in a second color chart which is different from the first color chart in RGB values or patch size of at least a part of patches, to obtain corrected RGB values; and converting, by the color conversion apparatus, the corrected RGB values into colorimetric values by using the scanner profile.

15. The method of claim 14,
wherein the printing system further includes a scanner and a colorimeter,
the method further comprises:
obtaining, by the color conversion apparatus, from the scanner, measured RGB values given by measurement of the patches in the first color chart with the scanner and measured RGB values given by measurement of the patches in the second color chart with the scanner; and
obtaining, by the color conversion apparatus, from the colorimeter, measured colorimetric values given by measurement of the patches in the first color chart with the colorimeter, and
the obtaining the scanner profile includes associating the measured RGB values of the patches in the first color chart obtained from the scanner, with the corresponding measured colorimetric values of the patches in the first color chart obtained from the colorimeter, to create the scanner profile.

16. The method of claim 14,
wherein the creating the table includes:
choosing a reference patch group being a group of a certain number of patches, from the first color chart;
creating a first plurality of patch groups by changing an RGB value of a patch located at a certain position in the reference patch group and creating a second plurality of patch groups by changing patch size of the reference patch group;
causing the printer to print the specific chart in which the first plurality of patch groups and the second plurality of patch groups are arranged;
obtaining measured RGB values given by measurement of patches in the specific chart with the scanner;
calculating RGB-value differences of set RGB values of patches in the specific chart from a mean RGB value of the first color chart, the patches in the specific chart being patches in the first plurality of patch groups in the specific chart and having been changed in RGB values in creating the first plurality of patch groups, the mean RGB value being given by averaging set RGB values of all of the patches in the first color chart;
calculating patch-size differences of patch sizes of the second plurality of patch groups in the specific chart from patch size of the first color chart;
calculating a first value by subtracting a set RGB value of a patch located at a center of each of the first and second plurality of patch groups in the specific chart, from the measured RGB value of the patch located at the center of each of the first and second plurality of patch groups in the specific chart;
calculating a second value by subtracting the mean RGB value of the first color chart, from the measured RGB value of a patch located at a center of the reference patch group in the first color chart;
subtracting the first value calculated for the patch located at the center of each of the first and second plurality of patch groups, from the second value, to obtain the correction amounts of RGB values; and
associating the correction amounts of RGB values with the corresponding RGB-value differences and the corresponding patch-size differences, to create the table.

17. The method of claim 16,
wherein the creating the table includes:
creating a first table by changing the RGB value of the patch located at the center of the reference patch group to RGB values, in the creating the first plurality of patch groups; and
creating a second table by changing an RGB value of each of patches surrounding the patch located at the center of the reference patch group to RGB values, in the creating the first plurality of patch groups, and
wherein the correcting the RGB values includes:
comparing set RGB values of the patches in the second color chart with the mean RGB value of the first color chart and further comparing sizes of the patches in the second color chart with the patch size of the first color chart, to calculate RGB-value differences and patch-size differences for the patches in the second color chart; and correcting the measured RGB values given by measurement of patches in the second color chart with the scanner, by using the first table to obtain the correction amount of an RGB value of each of the patches in the second color chart, associated with the RGB-value difference and the patch-size difference under a condition that the patch located at the center of the reference patch group is changed to the each of the patches in the second color chart, using the second table to obtain the correction amounts of an RGB value of each of the patches in the second color chart, associated with the RGB-value differences and the patch-size differences under a condition that each of the patches surrounding the patch located at the center in the reference patch group is changed to a corresponding one of patches surrounding each of the patches in the second color chart, and correcting the measured RGB value of each of the patches in the second color chart, by using the correction amounts obtained with the first table and the second table for the each of the patches in the second color chart.

18. The method of claim 17, wherein the reference patch group is composed of a matrix of nine patches, having three rows and three columns, in the first color chart, and the correcting the RGB values includes:

using the first table to obtain the correction amount of an RGB value of each of the patches in the second color chart, under a condition that an RGB value of the patch located at the center of the reference patch group is changed to the RGB value of the each of the patches in the second color chart;

using the second table to obtain the correction amounts of the RGB value of each of the patches in the second color chart, under a condition that an RGB value of each of eight patches surrounding the patch located at the center of the reference patch group is changed to an RGB value of a corresponding one of eight patches surrounding the each of the patches in the second color chart; and correcting the measured RGB value of each of the patches in the second color chart, by using a total correction amount calculated by adding up the correction amounts obtained by using the first table and the second table for the each of the patches in the second color chart.

19. The method of claim 14, wherein the patches in the first color chart are arranged so that a level of flare estimated for each of the patches in the first color chart is uniform.

* * * * *